(12) United States Patent
Faaborg et al.

(10) Patent No.: US 12,387,073 B2
(45) Date of Patent: *Aug. 12, 2025

(54) PLATFORM FOR REGISTERING AND PROCESSING VISUAL ENCODINGS

(71) Applicant: Google LLC, Mountain View, CA (US)

(72) Inventors: Alexander James Faaborg, Mountain View, CA (US); Brett Aladdin Barros, San Mateo, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/397,918

(22) Filed: Dec. 27, 2023

(65) Prior Publication Data
US 2024/0135126 A1  Apr. 25, 2024

Related U.S. Application Data

(63) Continuation of application No. 17/971,135, filed on Oct. 21, 2022, now Pat. No. 11,977,953, which is a
(Continued)

(51) Int. Cl.
*G06K 7/14* (2006.01)
*G06K 19/06* (2006.01)
*G06V 10/20* (2022.01)

(52) U.S. Cl.
CPC ......... *G06K 7/1443* (2013.01); *G06K 7/1447* (2013.01); *G06K 19/06103* (2013.01); *G06V 10/255* (2022.01)

(58) Field of Classification Search
CPC .......... G06K 19/06103; G06K 7/1443; G06K 7/1447; G06V 10/225; G06V 10/255;
(Continued)

(56) References Cited

U.S. PATENT DOCUMENTS 6,219,434 B1  4/2001  Saporetti et al.
6,360,948 B1  3/2002  Yang et al.
(Continued)

FOREIGN PATENT DOCUMENTS

CN  101765861  6/2010
CN  101911094  12/2010
(Continued)

OTHER PUBLICATIONS

Chinese Search Report for Corresponding to Application No. 2021111055898 dated Aug. 23, 2023, English translation unavailable, 3 pages.
(Continued)

*Primary Examiner* — Thien M Le
(74) *Attorney, Agent, or Firm* — DORITY & MANNING, P.A.

(57) ABSTRACT

The present disclosure relates generally to the processing of machine-readable visual encodings in view of contextual information. One embodiment of aspects of the present disclosure comprises obtaining image data descriptive of a scene that includes a machine-readable visual encoding; processing the image data with a first recognition system configured to recognize the machine-readable visual encoding; processing the image data with a second, different recognition system configured to recognize a surrounding portion of the scene that surrounds the machine-readable visual encoding; identifying a stored reference associated with the machine-readable visual encoding based at least in part on one or more first outputs generated by the first recognition system based on the image data and based at least in part on one or more second outputs generated by the second recognition system based on the image data; and performing one or more actions responsive to identification of the stored reference.

20 Claims, 20 Drawing Sheets

Related U.S. Application Data continuation of application No. 17/894,411, filed on Aug. 24, 2022, now Pat. No. 11,836,553, which is a continuation of application No. 17/025,597, filed on Sep. 18, 2020, now Pat. No. 11,429,804.

(58) Field of Classification Search
CPC ........ G06V 10/75; G06V 10/82; G06V 10/96; G06V 20/70; G06V 20/95
See application file for complete search history.

(56) References Cited

U.S. PATENT DOCUMENTS

| | | | |
|---|---|---|---|
| 6,533,182 | B1 | 3/2003 | Ohshima et al. |
| 7,475,824 | B2 | 1/2009 | Yoshida |
| 9,373,170 | B2 * | 6/2016 | Hirano .................. H04N 13/211 |
| 9,865,027 | B2 | 1/2018 | Arce et al. |
| 10,789,441 | B2 | 9/2020 | Tu |
| 2002/0104716 | A1 | 8/2002 | Zaharia |
| 2002/0105618 | A1 | 8/2002 | Edgar et al. |
| 2004/0241730 | A1 | 12/2004 | Yakhini et al. |
| 2006/0097062 | A1 | 5/2006 | Cheong et al. |
| 2006/0098241 | A1 | 5/2006 | Cheong et al. |
| 2012/0067952 | A1 | 3/2012 | Matsuda |
| 2012/0145779 | A1 | 6/2012 | Bietenbeck et al. |
| 2013/0026241 | A1 | 1/2013 | Sakahashi et al. |
| 2013/0112752 | A1 | 5/2013 | Negro et al. |
| 2013/0124540 | A1 | 5/2013 | Stibel et al. |
| 2014/0222948 | A1 * | 8/2014 | Terasawa ............ G06Q 30/0635 709/213 |
| 2015/0339508 | A1 * | 11/2015 | Hosokane ........ G06K 19/06037 235/494 |
| 2016/0162767 | A1 | 6/2016 | Ito et al. |
| 2016/0267341 | A1 | 9/2016 | Sathyanarayana Murthy |
| 2016/0350586 | A1 * | 12/2016 | Gieselman .............. G06F 18/40 |
| 2017/0140506 | A1 * | 5/2017 | Sato ..................... G06T 3/4053 |
| 2017/0270728 | A1 | 9/2017 | Troesch et al. |
| 2018/0260671 | A1 | 9/2018 | Chen |
| 2018/0341845 | A1 * | 11/2018 | Li ........................... G06K 7/14 |
| 2018/0367799 | A1 | 12/2018 | Carmel et al. |
| 2019/0012818 | A1 * | 1/2019 | Fine ..................... H04N 5/2624 |
| 2019/0095736 | A1 | 3/2019 | Stahfield |
| 2019/0279007 | A1 | 9/2019 | Zinner et al. |
| 2019/0311169 | A1 | 10/2019 | Xu et al. |
| 2019/0332840 | A1 * | 10/2019 | Sharma ................ G06K 7/1443 |
| 2019/0340477 | A1 | 11/2019 | Xu et al. |
| 2020/0117872 | A1 * | 4/2020 | Anderton ......... G06K 19/06103 |
| 2020/0288149 | A1 | 9/2020 | Mao et al. |
| 2021/0243314 | A1 * | 8/2021 | Munetomo ......... G06F 3/04817 |
| 2021/0262861 | A1 | 8/2021 | Kimpe |
| 2021/0392285 | A1 * | 12/2021 | Diasparra .............. G06V 10/26 |
| 2022/0038747 | A1 | 2/2022 | Lee et al. |
| 2022/0086466 | A1 | 3/2022 | Holland et al. |

FOREIGN PATENT DOCUMENTS

| | | |
|---|---|---|
| CN | 106156821 | 11/2016 |
| CN | 107067044 | 8/2017 |
| CN | 107563966 | 1/2018 |
| CN | 108717611 | 10/2018 |
| CN | 111507446 | 8/2020 |
| CN | 111639734 | 9/2020 |
| JP | 2019/016190 | 1/2019 |
| WO | WO 2019/026873 | 12/2020 |

OTHER PUBLICATIONS

Amazon Day 1 Echo Frames—Eyeglasses with Alexa, https://www.amazon.com/Staging-Product-Not-Retail-Sale/dp/B07W72XKPJ, retrieved on Sep. 18, 2020, 8 pages.

Chen, "QR Code Authentication with Embedded Message Authentication Code", Mobile New Appl 22, 2017, pp. 383-394.

Clover, "iOS 14 Leak Shows Off Apple-Branded QR Codes Found in 'Gobi' AR App", https://www.macrumors.com/2020/05/18/ios-14-leak-apple-qr-codes/, retrieved on Sep. 18, 2020, 9 pages.

Extended European Search Report Corresponding to Application No. EP21197550 on May 11, 2022, 12 pages.

Faulkner, "Facebook is Reportedly Teaming Up with Ray-Ban on its Smart AR Glasses", The Verge, https://www.theverge.com/2019/9/17/20870928/facebook-smart-ar-glasses-luxottica-ray-ban-maker-partnership, retrieved on Sep. 18, 2020, 2 pages.

Jones, "How to Create a QR Code to Accept Touch-Free Payment", PayPal, https://www.paypal.com/us/brc/article/how-to-install-a-qr-code, retrieved on Sep. 18, 2020, 11 pages.

Newton, "Snap Spectacles 3 Review: Reaching New Depths", The Verge, https://www.theverge.com/2019/11/12/20951783/snap-spectacles-3-review-snapchat-glasses-price-specs-Features, retrieved on Sep. 18, 2020, 11 pages.

Partial European Search Report Corresponding to Application No. EP21197550 on Jan. 31, 2022.

Perez, "iOS 14 Reimagines How You Find and use Apps with App Clips, Widgets and an App Library", Tech Crunch, https://techcrunch.com/2020/06/22/ios-14-reimagines-how-you-find-and-use-apps-with-app-clips-widgets-and-an-app-library/?guccounter—1&guce_referrer—aHR0cHM6Ly93d3cuZ29vZ2x1LmNvbS91cmw_c2E9aiZ1cmw9aHR0cHM1M0E1MkY1MkZ0ZWNoY3J1bmNoLmNvbSUyRjIwMjA1MkYwNiUyRjIyJTJGaW9zLTE0LXJlaW1hZ2luZXMtaG93LX1vdS1maW5kLWFuZC11c2UtYXBwcy13aXRoLWFwcC1jbGlwcy13aWRnZXRzLWFuZC1hbi1hcHAtbGlicmFyeSUyRiZ1Y3Q9MTYwOTk2MTU0OTkyNDgdTcyS0trUnhTWF1UYzEwRno0LiZzb3VyY2U9Y2hhdA&guce_referrer_sig—AQAAACcBJmEVxQ8Sqs_8UyxIjqpemZfIDMJup43VF9dvMGu5OX4-vQZBilAZ6QbBuc01jjAtfRmI8xXjBZbrffLoAfd1tr7uSSiL5s4In4Ch-9LZ39PPximJrz9es6SuMFp567Kr-uW50SD1kesG334REC-ZMv10Pj6uj13VQd5s401d, retrieved on Sep. 18, 2020, 11 pages.

Rossignol, "IOS 14 Leak Reveals Apple Developing New Augmented Reality App Codenamed 'Gobi' with QR Code-Like Tags", https://www.macrumors.com/2020/03/10/ios-14-augmented-reality-app-gobi/, retrieved on Sep. 18, 2020, 8 pages.

Sandi et al., "Smart Tags for Brand Protection and Anti-Counterfeiting in Wine Industry", 23rd International Scientific-Professional Information Technology Conference, Feb. 19-24, 2018, Zabljak, Montenegro, 6 pages.

Vincent, "Apple Reportedly Plans 2022 Release for First AR Headset, followed by AR Glasses in 2023", The Verge, https://www.theverge.com/2019/11/11/20959066/apple-augmented-reality-ar-headset-glasses-rumors-reported-release-date, retrieved on Sep. 18, 2020, 3 pages.

\* cited by examiner

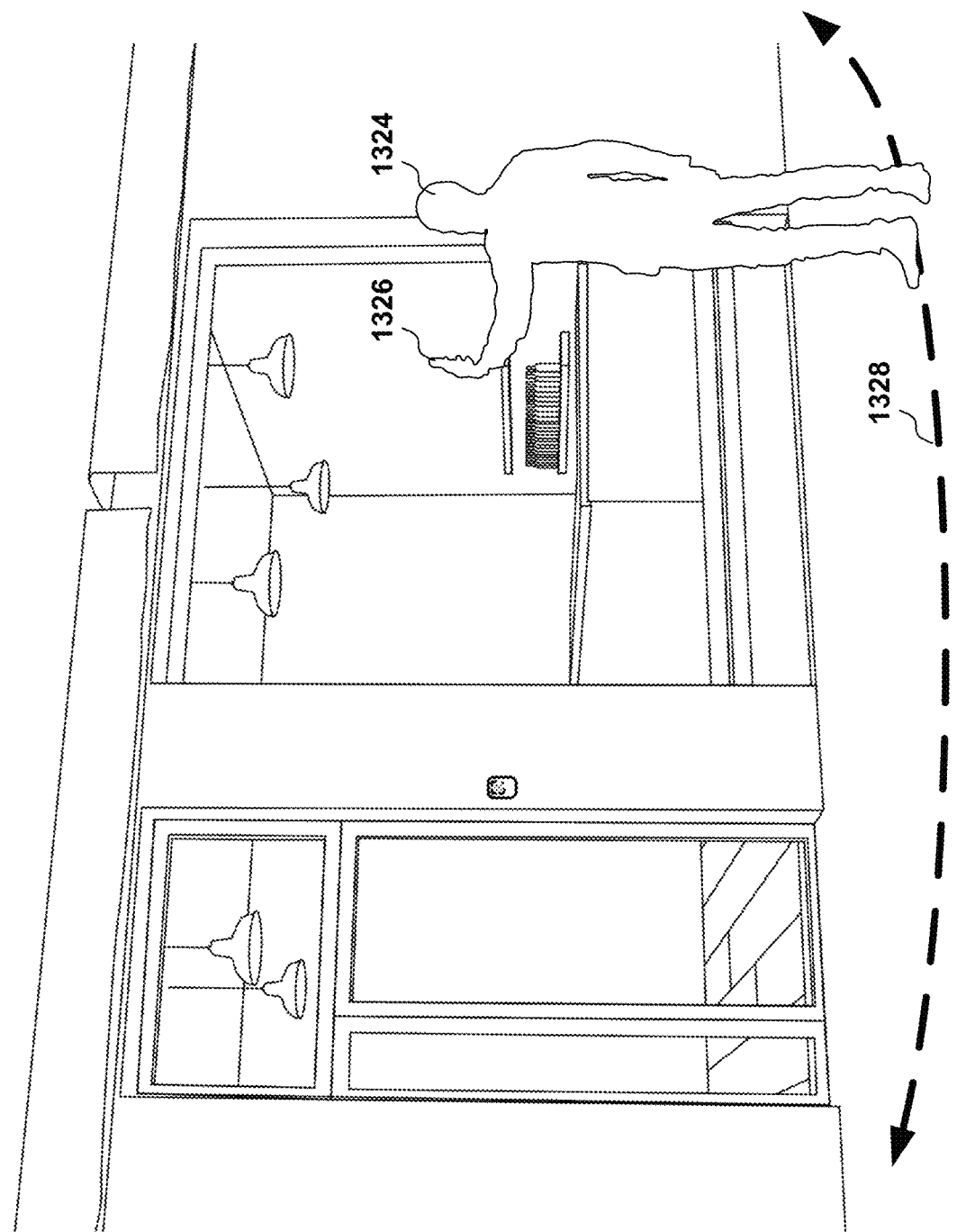

PLATFORM FOR REGISTERING AND PROCESSING VISUAL ENCODINGS

PRIORITY CLAIM

The present application is a continuation of U.S. application Ser. No. 17/971,135, having a filing date of Oct. 21, 2022, which is a continuation of U.S. application Ser. No. 17/894,411, having a filing date of Aug. 24, 2022, which is a continuation of U.S. application Ser. No. 17/025,597 having a filing date of Sep. 18, 2020. Applicant claims priority to and the benefit of each of such applications. The entirety of each of such applications is incorporated herein by reference.

FIELD

The present disclosure relates generally to visual encodings. More particularly, the present disclosure relates to a platform for the registration and/or processing of visual encodings.

BACKGROUND

Visual patterns have been used to encode information in the form of visual encodings. For example, bar codes are commonly used to communicate information about products in a store. Retrieving information encoded in such patterns typically requires imaging with sufficient acuity to discern certain features of the patterns (e.g., to detect and process the bars of the barcode). In some practical applications, obtaining images of the patterns with sufficient detail to interpret the patterns presents many challenges. In addition, because visual patterns are not always interpretable by users, users can be susceptible to malicious activity associated with fraudulent visual patterns.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for processing machine-readable visual encodings. The method includes obtaining, by a computing system comprising one or more computing devices, image data descriptive of a scene that includes a machine-readable visual encoding. The method includes processing, by the computing system, the image data with a first recognition system configured to recognize the machine-readable visual encoding. The method includes processing, by the computing system, the image data with a second, different recognition system configured to recognize a surrounding portion of the scene that surrounds the machine-readable visual encoding. The method includes identifying, by the computing system, a stored reference associated with the machine-readable visual encoding based at least in part on one or more first outputs generated by the first recognition system based on the image data and based at least in part on one or more second outputs generated by the second recognition system based on the image data. The method includes performing, by the computing system, one or more actions responsive to the identification of the stored reference.

Another example aspect of the present disclosure is directed to a computing system for performing actions responsive to the recognition of machine-readable visual encodings. The computing system includes one or more processors and one or more non-transitory computer-readable media that collectively store instructions that, when executed by the one or more processors, cause the computing system to perform operations. The operations include obtaining image data descriptive of a scene that contains a machine-readable visual encoding. The operations include transmitting the image data to a recognition server system for processing by the recognition server system, the recognition server system comprising a first recognition system configured to recognize the machine-readable visual encoding and a second, different recognition system configured to recognize a surrounding portion of the scene that surrounds the machine-readable visual encoding. The operations include performing one or more actions based at least in part on an association between a stored reference and the image data, the association having been determined by the recognition server system using one or more first outputs generated by the first recognition system and using one or more second outputs generated by the second recognition system.

Another example aspect of the present disclosure is directed to one or more non-transitory computer-readable media that collectively store instructions that, when executed by one or more processors, cause the one or more processors to perform operations. The operations include receiving image data descriptive of a scene that includes a machine-readable visual encoding, the image data additionally descriptive of context of the machine-readable visual encoding. The operations include associating the image data with a stored reference. The associating includes determining, with a first recognition system, a first similarity between the machine-readable visual encoding and the stored reference; and determining, with a second recognition system, a second similarity between the context and the stored reference. The operations include initiating one or more operations based on said associating.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 11C depicts a user generating reference data according to example embodiments of the present disclosure;

Figure 1:
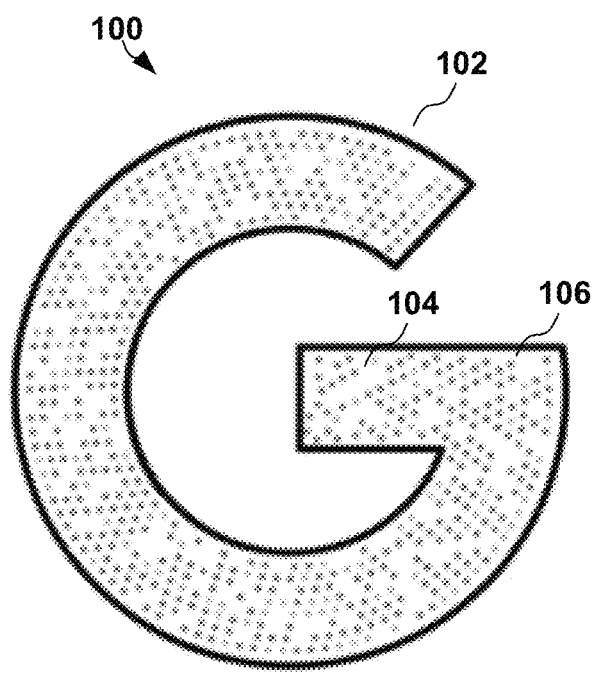
FIG. 1 depicts a machine-readable visual encoding according to example embodiments of the present disclosure.

Reference numerals that are repeated across plural figures are intended to identify the same features in various implementations.

DETAILED DESCRIPTION

Overview

Generally, the present disclosure is directed to the processing of visual encodings in view of contextual information. Contextual information can be used, in some embodiments, to assist in the recognition, identification, and/or processing of the visual encoding. The use of contextual information according to aspects of the present disclosure can advantageously provide for robust platforms for recognizing and processing visual encodings.

One example aspect of the present disclosure is directed to computing systems and methods which use multiple data signals and/or multiple processing systems to process or recognize a visual encoding (e.g., which may correspond to a call to action point in the real world). The use of multiple systems which respectively operate on different data signals and/or with different processing techniques can enable the system to effectively recognize the visual encoding at a wide range of different distances. For example, for visual encodings placed on large surfaces or otherwise within a particular environment or scene, a user may capture imagery at various distances from the visual encoding, e.g., from a close up view to several or many meters away, including situations where the visual encoding is out of view or fully or partially obscured. Typical visual encoding processing systems are not capable of handling this variance in image distance. To resolve this issue, some example implementations of the present disclosure leverage multiple different recognizers which cooperatively operate (e.g., in parallel and/or in series) to process the visual encoding (e.g., to cause or unlock an augmented reality experience). As one example, some example systems can employ three different recognition systems: a near-field visual encoding reader that directly processes the visual encoding; an image recognition-based system that recognizes semantic entities, objects, and/or other content known to be included in the surrounding area of the encoding; and a visual positioning system that is capable of recognizing a location based on visual or spatial features. Other example systems can operate based on various other forms of context data such as time of day, location (e.g., as provided by a GPS system), etc. Some example systems can also feature a low power digital signal processor that triggers the above systems to operate when a visual encoding is initially detected. Each of these systems can provide the best performance at different distances. For example, the near-field reader can provide the relatively best performance at close ranges (e.g., 10 centimeters), the image recognition-based system can provide the relatively best performance at medium ranges (e.g., 10 meters), and the visual positions system can provide the relatively best performance at longer ranges. Various logic or triaging algorithms can be used to provide for cooperative operation from the multiple systems. As one example, a most-efficient system may operate first and, if such system is unable to recognize the encoding, then a next-most-efficient system can be triggered. As another example, the multiple systems can operate in parallel and their results can be combined (e.g., via voting/confidence or first-to-recognize paradigms). Using multiple different recognition systems in this manner can enable visual encoding processing with improved accuracy and efficiency. For example, the use of the visual positioning system may enable the computing system to disambiguate between the same visual encoding which is placed at multiple different locations (e.g., a visual encoding present on a widely distributed movie poster).

Another example aspect of the present disclosure is directed to location-based payment fraud protection using contextual data. In particular, one example application of visual encodings is to enable payment. However, certain visual encodings (e.g., QR codes) follow a public protocol and allow anyone to generate a code that appears identical to human viewers. Thus, a malicious actor could print a similar looking visual encoding and place it over an existing commercial encoding. The malicious encoding could re-route a user that scans the encoding to a fraudulent payment portal. To resolve this issue, example implementations of the present disclosure can use context information to verify visual encodings and/or slow down or block users from making encoding-based payments to fraudulent encodings. Specifically, as described above, a computing system can include and use multiple different processing systems, each of which operates on different signals and/or using different processing techniques. As such, example implementations of the present disclosure enable the association of a visual encoding with some or all of such different signals or information, including, for example, the visual feature points surrounding the encoding, surrounding semantic entity data, location data such as GPS data, ambient noise (e.g., highway noise, payment terminal noise), and/or other contextual information. Thereafter, any time a visual encoding is scanned, these additional data points can be evaluated and associated with the visual encoding. This adds a verifying texture to each visual encoding which can later be used to detect fraudulent encodings. Specifically, as one example, when a visual encoding is first scanned and contextual data cannot be confirmed for such visual encoding, the system may present a warning to the user before proceeding. As another example, if a new visual encoding is scanned and has contextual information that matches an existing coding, the new visual encoding can be blocked or subject to additional verification routines. Thus, to continue the example given above, a contextual "fingerprint" may be generated over time for an authenticated and registered visual encoding at a particular location or business. Then, if a malicious actor seeks to cover or replace the existing coding, the contextual "fingerprint" for the fraudulent encoding will match the existing encoding, triggering one or more fraud prevention techniques.

Another example aspect of the present disclosure is directed to techniques which enable improved object (e.g., product) recognition using contextual data. In particular, the use of barcodes is a time-tested technology. However, the index it uses to find results is often faulty or incomplete. Even for standardized barcodes, coverage is often around 80%. To resolve this issue, example implementations of the present disclosure can use visual information surrounding a visual encoding (e.g., as well as other contextual signals) as a supplemental path for recognizing objects (e.g., returning product results) when a user attempts to scan a visual encoding. For example, consider an image of a product packaging that includes a visual encoding (e.g., barcode). If the visual encoding is not effectively registered in an associated index, typical systems may return the wrong or no results. However, example systems described herein may use other features to identify the object. As one example, text or imagery of the product present on the packaging can be recognized, which can then be searched for as a product or generic web query. In another example, multiple images of the visual encoding or surrounding scene can be joined together in a "session" to form a more complete understanding of the product and update the index. Specifically, after a user has scanned a visual encoding that is not present in an index but contextual signals have been used to recognize the associated object/product, the associated object/product and visual encoding can be added to the index. Thus, the mapping of encodings to objects of an index can evolve or be supplemented over time based on anonymized aggregate user engagement. The proposed systems can also operate to disambiguate between multiple potential solutions to a visual encoding. For example, sometimes non-conforming product encodings will contain the same ID for different products. As such, some example implementations can capture the visual features surrounding a visual encoding and use that as secondary identifying information, for example to distinguish between competing ID maps.

The proposed systems and methods can be used in a number of different applications or use cases. As one example, the proposed visual encoding platform can be used to authenticate and/or effectuate package deliveries to secure or other access limited locations. As one example, imagery (e.g., captured by a camera-enabled doorbell) can be used to authenticate high-value deliveries and coordinate a very brief unlock/re-lock protocol with a door that includes a smart lock. During this time, a package delivery person could place the product inside the secure location rather than manual acceptance of the package. Thus, in one example, each delivery person may have a temporally generated code that attaches their account to any delivery unlocks. Each package may also have a unique code that the visual encoding platform can associate with product purchases. If value criteria set by deliverer/receiver are met, the door may be unlocked when the deliverer presents the package code to the doorbell camera. The door may remain unlocked for one of: a short period of time, until the door is closed, or until the deliverer scans their badge. Thus, a visual encoding can represent data beyond just identification of the object itself. For example, processing of the visual encoding can trigger a detailed process (e.g., performed by multiple cloud-based or IoT devices) for security verification for fully automated (i.e., no user intervention) package delivery.

More particularly, systems and methods according to embodiments of the present disclosure can identify one or more machine-readable visual encodings within a scene. A machine-readable visual encoding can include, in some embodiments, 1-dimensional (1-D) patterns, 2-dimensional (2-D) patterns, 3-dimensional (3-D) patterns, 4-dimensional (4-D) patterns, and combinations thereof, including combinations of 1-D and 2-D patterns with other visual information, including photographs, sketches, drawings, logos, etc. One example embodiment of a machine-readable visual encoding is a QR code. A scene can provide visual and/or spatial context for the machine-readable visual encoding(s) therein and include a depiction of one or more machine-readable visual encodings where they are deployed. For instance, although a scene in some embodiments can include only a depiction of the machine-readable visual encoding(s), a scene in some embodiments can also include the machine-readable visual encoding(s) and any object(s), person(s), or structure(s) to which they are affixed, as well as any other object(s), person(s), or structure(s) that may be nearby and/or otherwise visible in an image captured of the scene.

Systems and methods of the present disclosure can identify one or more machine-readable visual encodings within a scene based on processing of image data descriptive of the scene. In some examples, image data can include photographic or other spectral imaging data, metadata, and/or encodings or other representations thereof. For example, photographic or other spectral imaging data can be captured by one or more sensors of a device (e.g., a user device).

Photographic or other spectral imaging data can be obtained from one or more imaging sensors on a device (e.g., one or more cameras of a mobile phone) and, in some example embodiments, stored as bitmap image data. In some embodiments, the photographic or other spectral imaging data can be obtained from one or more exposures from each of a plurality of imaging sensors on a device. The imaging sensors can capture spectral information including wavelengths visible and/or wavelengths invisible to the human eye (e.g., infrared). Metadata can provide context for the image data and include, in some examples, geospatial data (e.g., GPS location, a position with respect to nearby mapped element(s), such as roads and/or places of business, a pose of the device with respect to the imaged features, such as the machine-readable visual encodings, etc.), time data, telemetry data (e.g., orientation, velocity, acceleration, altitude, etc. of a device associated with the image data), account information associated with a user account of one or more services (e.g., an account corresponding to a device associated with the image data), and/or pre-processing data (e.g., data generated by pre-processing of the image data, such as by a device which generates the image data). In one embodiment, pre-processing data can include a depth mapping of features of the imaging data captured by one or more imaging sensor(s).

Examples of image data can also include encodings or other representations of imaging data captured by one or more imaging sensor(s). For instance, in some embodiments, the image data can contain a hash value generated based on bitmap imaging data. In this manner, a representation of the bitmap imaging data may be used in the image data instead of or in addition to the bitmap imaging data itself (or one or more portions thereof).

The image data can be processed by one or more recognition systems. For instance, one or more portions of the image data (and/or the entirety of the image data) can be respectively processed by a plurality of recognition systems. A recognition system can comprise a general-purpose image recognition model and/or one or more models configured for certain recognition tasks. For instance, a recognition system can include, in some embodiments, a facial recognition system, an objection recognition system, a landmark recognition system, a depth mapping system, a machine-readable visual encoding recognition system, an optical character recognition system, a semantic analysis system, and/or the like.

In some embodiments, image data descriptive of a scene that includes a machine-readable visual encoding can be processed by an encoding recognition system configured to recognize machine-readable visual encodings. While only a portion of the image data descriptive of the machine-readable visual encoding (e.g., a segment of an image) may be processed by the encoding recognition system in some embodiments, the encoding recognition system may also be configured to process the image data in whole or in part. For instance, in some embodiments a pre-processing system recognizes the presence of a machine-readable visual encoding and extracts a portion of the image data that relates to the machine-readable visual encoding. The extracted portion may be then processed by the encoding recognition system for identification thereby. Additionally, or alternatively, the entirety of the image data can be processed by the encoding recognition system directly.

In some examples, the image data can be processed further by one or more additional recognition systems. For instance, the image data can be processed by an encoding recognition system configured to recognize machine-readable visual encodings and by another recognition system different than the encoding recognition system. In one embodiment, the other recognition system(s) can be configured to recognize various aspects of the context associated with the machine-readable visual encoding(s). For instance, the other recognition system(s) can include a recognition system configured to recognize one or more portions of a scene described by the image data (e.g., a surrounding portion of a scene surrounding one or more machine-readable visual encodings contained in the scene). In some embodiments, the other recognition system(s) can include a recognition system configured to recognize spectral information conveyed in the image data (e.g., an infrared exposure). In some embodiments, the other recognition system(s) can include a recognition system configured to process metadata included in the image data.

In some embodiments, recognizing one or more features of the image data can include associating the features with one or more stored references. In some embodiments, a stored reference can be a set of data registered as corresponding to one or more machine-readable visual encodings (and/or one or more entities associated therewith). For example, a stored reference may be created when one or more machine-readable visual encodings are generated to register data associated with the one or more machine-readable visual encodings (e.g., metadata, nearby object(s), person(s), or structure(s), etc., associated with the implementation(s) of the one or more machine-readable visual encodings). In some embodiments, data descriptive of a stored reference can be received by one or more recognition systems contemporaneously with image data descriptive of a scene containing one or more machine-readable visual encodings. For example, a stored reference can comprise data descriptive of the context in which a machine-readable visual encoding is positioned (e.g., location, time, environmental information, nearby device(s), network(s), etc.) that is updated at or near the time (e.g., contemporaneously) image data descriptive of the scene containing the machine-readable visual encoding is captured and/or received.

In some embodiments, a set of stored references can be associated with the same predetermined algorithm(s) and/or standard(s) for generating machine-readable visual encodings. For instance, a machine-readable visual encoding can be generated by encoding one or more data items (e.g., instructions and/or information) into a visual pattern according to the predetermined algorithm(s) and/or standard(s). In this manner, an encoding recognition system can recognize that a machine-readable visual encoding is associated with at least one of the stored references of the set of stored references and process the machine-readable visual encoding according to the predetermined algorithm(s) and/or standard(s) to decode the visual pattern to retrieve the one or more data items.

A stored reference can also include information descriptive of one or more machine-readable visual encodings and/or information descriptive of context associated with one or more of the machine-readable visual encodings. For instance, a stored reference can include data descriptive of contextual aspects of the machine-readable visual encoding (s), such as visual features in which the one or more one or more data items are not encoded (e.g., design and/or aesthetic features, shape, size, orientation, color, etc.). In this manner, one or more machine-readable visual encodings can be respectively associated with one or more stored references (or, optionally, one or more sub-references of a single stored reference) based at least in part on non-encoded contextual features of the one or more machine-readable visual encodings. In one example, two machine-readable visual encodings can encode the same data item(s) (e.g., instructions to perform an operation). However, image data descriptive of the machine-readable visual encodings can indicate that one of the machine-readable visual encodings is, for example, outlined by a different shape than another of the machine-readable visual encodings, and an encoding recognition system can thereby distinguish the machine-readable visual encodings and respectively associate the machine-readable visual encodings with different stored references and/or sub-references.

For instance, a stored reference can include data descriptive of other context associated with one or more machine-readable visual encodings, such as a scene in which the one or more machine-readable visual encodings may be found and/or metadata associated with the one or more machine-readable visual encodings. In this manner, portions of image data descriptive of contextual information can also be recognized as being associated with one or more stored references. For instance, one or more image recognition systems can process image data descriptive of contextual information to recognize one or more persons, objects, and/or structures indicated thereby, optionally determining whether any relationship exists between such contextual information and one or more machine-readable visual encodings within a scene (e.g., relative positioning, semantic association, and/or the like). In some examples, one or more recognition systems can associate the image data with one or more stored references in view of metadata comprised by the image data (e.g., by comparing location or other metadata with a location or other feature associated with a stored reference).

In some embodiments, stored references descriptive of one or more scenes containing machine-readable visual encodings can be authenticated and/or registered. For instance, an entity associated with a particular implementation of a machine-readable visual encoding can elect to register and/or authenticate stored references associated therewith. In this manner, other entities (e.g., malicious entities, mistaken entities, competing entities, etc.) can be prohibited from generating, storing, or otherwise documenting stored references of the same scene. In some embodiments, such prohibition can ensure that certain entities cannot fraudulently impersonate or otherwise spoof the authenticated contextual data of the registered stored references. Registration can include performing a "sweep" (e.g., 180 degree or 360 degree) with a camera to capture various visual characteristics of a scene.

In some embodiments, portions of image data descriptive of one or more machine-readable visual encodings and portions of image data descriptive of contextual information can be respectively associated with one or more stored references by one or more recognition systems. In some embodiments, a portion of image data descriptive of contextual information can be processed by a different recognition system or system(s) than a portion of image data descriptive of one or more machine-readable visual encodings (although, in some embodiments, the same recognition system(s) can process both portions). Each of the respective associations can comprise determining a similarity with different confidence levels. In some embodiments, the confidence level with which a portion of image data descriptive of one or more machine-readable visual encodings is similar to aspects of a stored reference can be compared to the confidence with which a portion of the image data descriptive of contextual information is similar to aspects of the same stored reference (or, e.g., sub-reference thereof).

In some embodiments, processing of a machine-readable visual encoding is determined to be successful (e.g., recognized, identified, etc.) if at least one of the confidence levels meets or exceeds a predetermined confidence threshold and/or target value. In some embodiments, a composite confidence score may be required for the completion of processing (e.g., for verification). In some embodiments, a portion of image data descriptive of contextual information can be processed by a different recognition system as a failsafe or alternate option responsive to a determination that another portion of image data descriptive of one or more machine-readable visual encodings is not recognized with a high enough confidence score.

Upon successful recognition, a recognition system can initiate operations. For example, an operation can comprise verifying that the image data corresponds to the machine-readable visual encoding, verifying that the image data corresponds to the machine-readable visual encoding in an approved and/or predetermined context (e.g., in an appropriate location), and the like. In some embodiments, such a verification may be received by the device which produced the image data (e.g., captured the image(s)). In some embodiments, such a verification may be received by one or more provider systems (e.g., third-party provided systems) associated with the machine-readable visual encoding(s). The verification can comprise a verification indicator, which may include security credentials required for processing data encoded in the machine-readable visual encoding. Other operations can include initiating a secured connection between the device and another system (e.g., such as for a secured data exchange).

Systems and methods according to embodiments of the present disclosure convey several technical effects and benefits. For instance, processing machine-readable visual encodings in view on contextual information as disclosed herein can provide for improved robustness of recognition processes against noise, data loss, and measurement errors and/or deficiencies. In some embodiments, systems and methods according to embodiments of the present disclosure can provide for the recognition and processing of machine-readable visual encodings even when such encodings cannot be unambiguously resolved by the imaging sensor(s) of an imaging device, improving the recognition capabilities above and beyond any limitations of the imaging device (e.g., insufficient sensor and/or optical resolution). Thus, in some instances, visual encodings can be recognized/processed more efficiently, as multiple types or modalities of data can be used to recognize the visual encoding, thereby reducing the number of images that need to be processed to recognize the encoding. This more efficient processing can result in savings of computing resources such as processor usage, memory usage, bandwidth usage, etc.

Additional technical benefits flowing from the improved recognition techniques according to aspects of the present disclosure include enabling encodings to be produced at smaller sizes and in visual configurations more conducive to incorporation into various implementations. In this manner, less material and labor will be consumed in the implementation of machine-readable visual encodings. The lower barrier to implementation also permits widespread adoption, bringing efficiencies to communication of data (e.g., by compactly encoding data in visual patterns) to reduce data transmission costs, and the like.

Additional technical benefits include the capacity to communicate greater amounts of data using a given machine-readable visual encoding. For instance, some machine-readable visual encodings may be generated to correspond to a standard which provides for a given number of visual "bits" to encode data for a given size (e.g., printed area, displayed area, etc.). In some examples, at least some of the visual "bits" may be used for error correction and/or alignment for processing the encoding. Advantageously, systems and methods according to embodiments of the present disclosure can provide for improved error correction, alignment, and/or data communication without expending additional visual "bits," and in some embodiments may retain compatibility with encoding recognition systems which do not process contextual data. Some embodiments can provide for improved analytics by using contextual information to distinguish between otherwise equivalent machine-readable visual encodings, allowing a single machine-readable visual encoding to be deployed in a plurality of contexts for lower production costs (e.g., due to economies of scale in display, printing, distribution, etc.) while retaining the capacity to offer granular recordkeeping.

Additional technical benefits also include improved security for processing machine-readable visual encodings. In some embodiments, malicious actors may attempt to alter and/or replace one or more machine-readable visual encodings to assert control over any device(s) processing the machine-readable visual encodings. Example embodiments can prevent the success of such attacks by comparing one or more features of the machine-readable visual encodings and/or one or more contextual aspects thereof with a stored reference, exposing the inconsistencies in the attacker's machine-readable visual encoding (or misuse or misplacement of a legitimate machine-readable visual encoding). In this manner, embodiments can also mitigate attempts to perpetrate fraud via machine-readable visual encodings. In some embodiments, attempts to defraud a user using a device to process machine-readable visual encodings by altering the encoding can be mitigated. Similarly, attempts to defraud a service provider (e.g., an entity associated with the generation of the machine-learned visual encoding) can be mitigated by ensuring that only correct and authentic machine-readable visual encodings are processed by user devices.

Additional technical benefits include improved control of data communicated by or responsive to the processing of machine-readable visual encodings. For instance, the processing of a machine-readable visual encoding can be limited in view of its context such that certain contextual conditions are required to perform operations associated with the machine-readable visual encoding. Such control can be exercised in a post-hoc fashion, after the machine-readable visual encoding has been generated, displayed (e.g., printed), and/or distributed, permitting granular control while decreasing customization costs (e.g., printing consumables, individualized distribution costs, size of encoding and/or visual "bits" dedicated to unique identification, etc.).

With reference now to the Figures, example embodiments of the present disclosure will be discussed in further detail.

Example Devices and Systems

FIGS. 1 to 9B depict example embodiments of machine-readable visual encodings according to aspects of the present disclosure. Although example depictions are provided herein that conform to particular geometries, layouts, and configurations, it is to be understood that the examples provided herein are for illustrative purposes only. It is to be understood that adaptations and modifications of the illustrative examples provided herein remain within the scope of the present disclosure.

FIG. 1 depicts an example embodiment of machine-readable visual encodings which comprises the shape of a letterform. The machine-readable visual encoding 100 of FIG. 1 comprises the letterform 102 of the letter "G" filled with a visual pattern 104. In some embodiments, the visual pattern 104 can comprise shapes 106 on a background, and the visual contrast between the shapes 106 and the background can indicate the value of a "bit" of information. In some embodiments, the geometric relations of shapes 106 within the visual pattern (e.g., relative size of shapes 106, distance between shapes 106, contours of filled area and/or unfilled area, etc.) can be used to encode information. For instance, a recognition system could be trained to recognize distinct aspects of the visual pattern 104 and associate image data descriptive of the machine-readable visual encoding 100 with a stored reference corresponding thereto. Although FIG. 1 depicts a visual pattern 104 formed of discrete shapes, it is to be understood that a visual pattern can comprise continuous features which encode information. For instance, an alternative machine-readable visual encoding 200 can comprise another letterform and/or another visual pattern. For example, the alternative visual pattern can include waveforms which can individually possess information-encoding features, such as amplitudes, frequencies, phases, line thicknesses, and the like. Although FIG. 1 depicts individual letterforms, it is to be understood that two or more letterforms can be combined (e.g., to form a word, logo, etc.). In this manner, machine-readable visual encodings can be integrated into and form a part of a desired aesthetic using discrete and/or continuous visual features.

Figure 3:
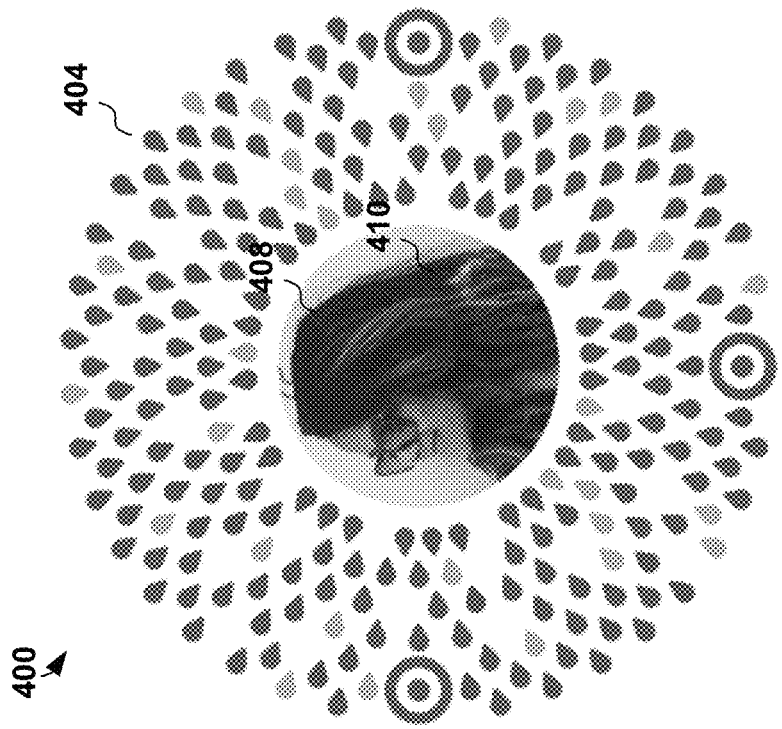
FIG. 3 depicts a machine-readable visual encoding according to example embodiments of the present disclosure.
Figure 2:
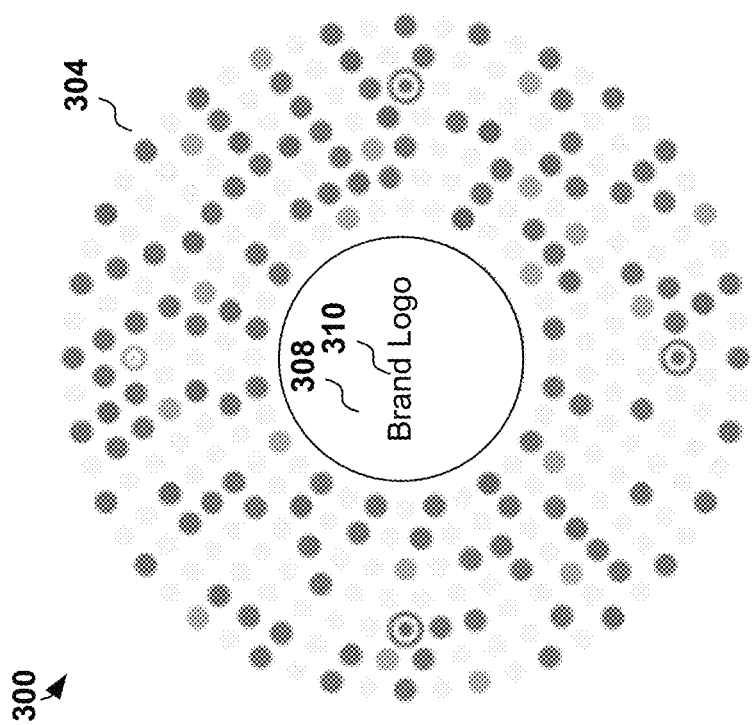
FIG. 2 depicts a machine-readable visual encoding according to example embodiments of the present disclosure.

FIGS. 2 and 3 depict example embodiments of machine-readable visual encodings which comprise visual patterns combined with other visual information. In FIG. 2, depicting an example encoding 300, a visual pattern 304 surrounds a central space 308 containing textual and/or graphical information 310 (e.g., a brand name, descriptor, etc.). Although, in some embodiments, the central space 308 may not contain encoded data, the contents of the central space 308 (e.g., textual information 310) can provide context for processing of the visual pattern 304. For instance, image data descriptive of the machine-readable visual encoding 300 can comprise information descriptive of the central space 308 as context data, and a semantic recognition system can analyze the textual information 310 to assist and/or complement the recognition of the visual pattern 304. In FIG. 3, an example encoding 400 comprises a visual pattern 404 surrounding a central space 408 containing a photograph or other avatar 410 of a person. As discussed with reference to the textual information 310, the photograph 410 can provide context to assist and/or complement the recognition of the visual pattern 404 or subsequent processing thereof. For instance, the visual pattern 404 may communicate instructions to perform an operation, such as to communicate encrypted data to a user account, and the photograph 410 can correspond to a user associated with the user account. In some embodiments, for example, a malicious actor would not be able to redirect an encrypted data stream by merely altering the visual pattern 404 to specify a different destination, as the different destination would no longer be associated with the account associated with the photograph 410, and the inconsistency would be detectable.

Although the visual patterns 304 and 404 comprise a number of arranged circular shapes, it is to be understood that any number of visual patterns may be used which exploit pluralities of shapes, geometric arrangements, color hues, and/or color values to encode data. Additionally, although certain variations can encode as visual "bits" (e.g., light/dark as 0/1), each variation can optionally encode more than a single bit, with certain variations (e.g., different shapes and/or sizes) corresponding to predetermined values or data objects.

Figure 5:
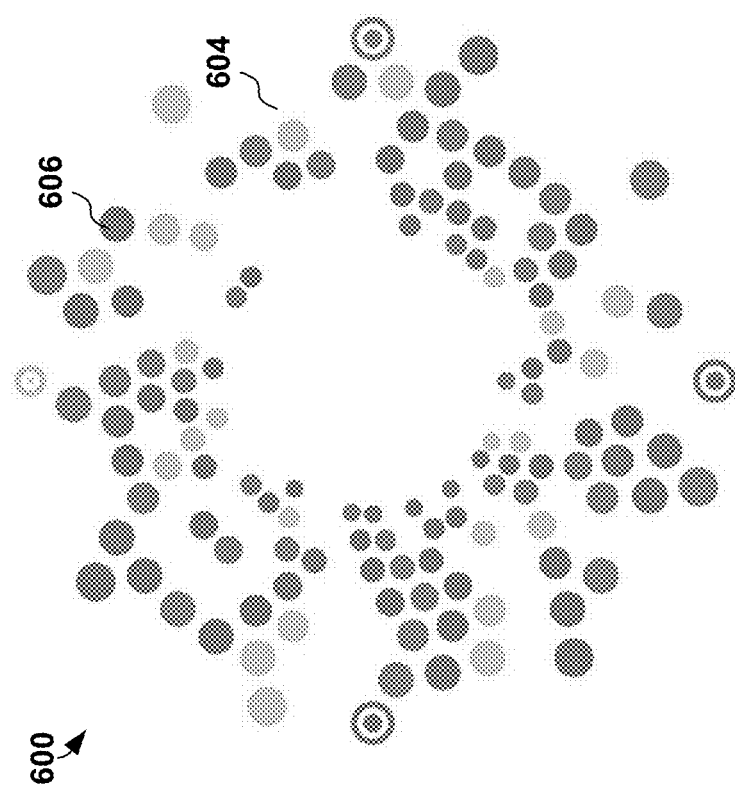
FIG. 5 depicts a machine-readable visual encoding according to example embodiments of the present disclosure.
Figure 4:
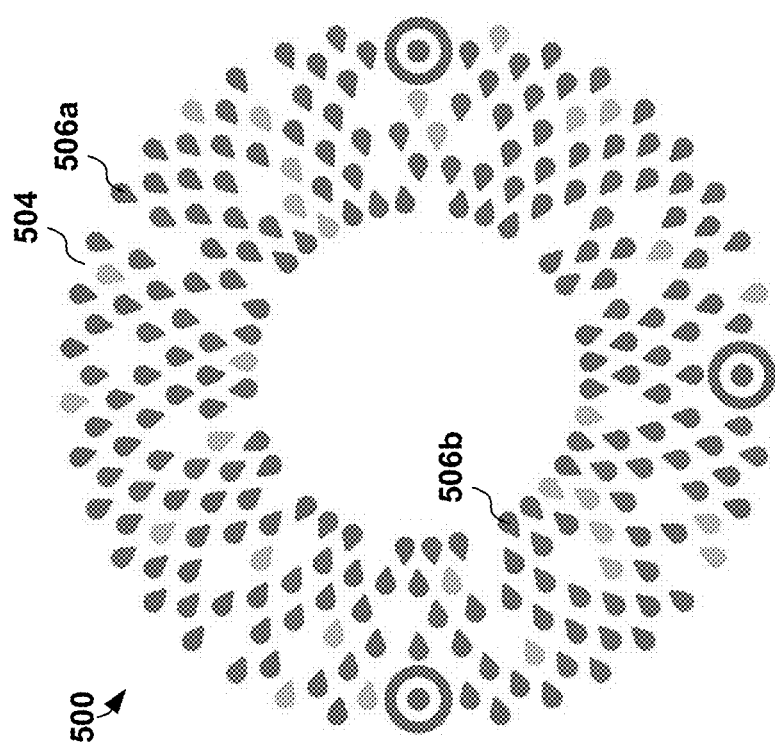
FIG. 4 depicts a machine-readable visual encoding according to example embodiments of the present disclosure.
Figure 6:
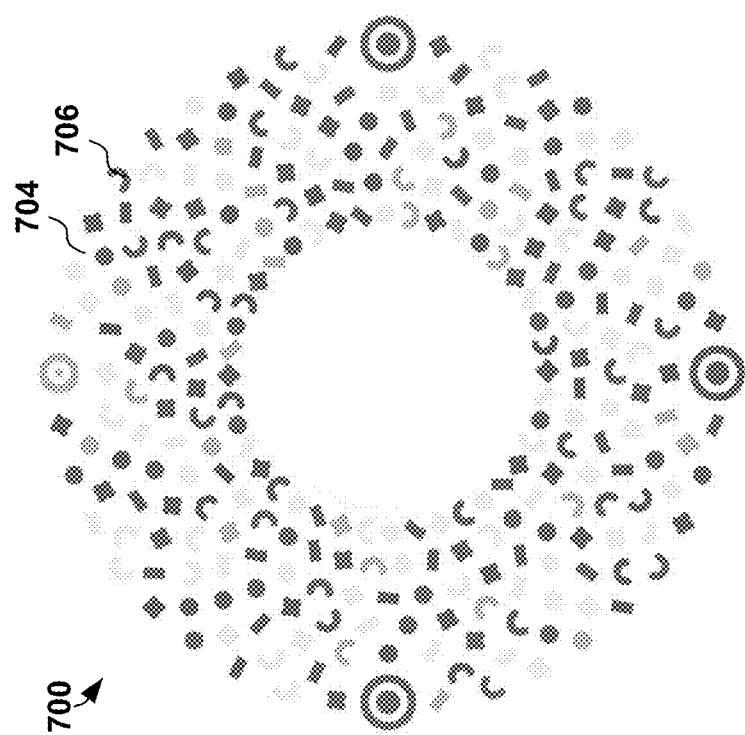
FIG. 6 depicts a machine-readable visual encoding according to example embodiments of the present disclosure.

FIG. 4 depicts one example embodiment of an encoding 500 that comprises a visual pattern 504 of shapes 506a, 506b. The shapes 506a, 506b can encode information based on the value (e.g., ranging from white to black in a greyscale embodiment, and optionally being binned to one or more predetermined values, such as white, light blue, dark blue), the orientation (e.g., positive radial direction, such as shape 506a, or negative radial direction, such as shape 506b), and/or the location (e.g., based on quadrants of the encoding 500). Another example embodiment in FIG. 5 depicts an example encoding 600 which comprises a visual pattern 604 of a plurality of shapes 606 of differing sizes, values, and positions. As demonstrated in FIG. 6, a visual pattern is not restricted to variations of any single shape, as an example encoding 700 can comprising a visual pattern 704 containing a plurality of shapes 706, each of which can be associated with a value, position, orientation, and size. Another example encoding can employ a visual pattern having continuous shapes arranged in concentric rings. Just as shape, value, position, orientation, and size can correspond to encoded data, groups of positions can also correspond to certain classes of data. For instance, one or more rings of the encoding can be assigned to encode data of a particular class (e.g., identification number), and the length and/or value of each arc segment in the ring can indicate values thereof.

Figure 8:
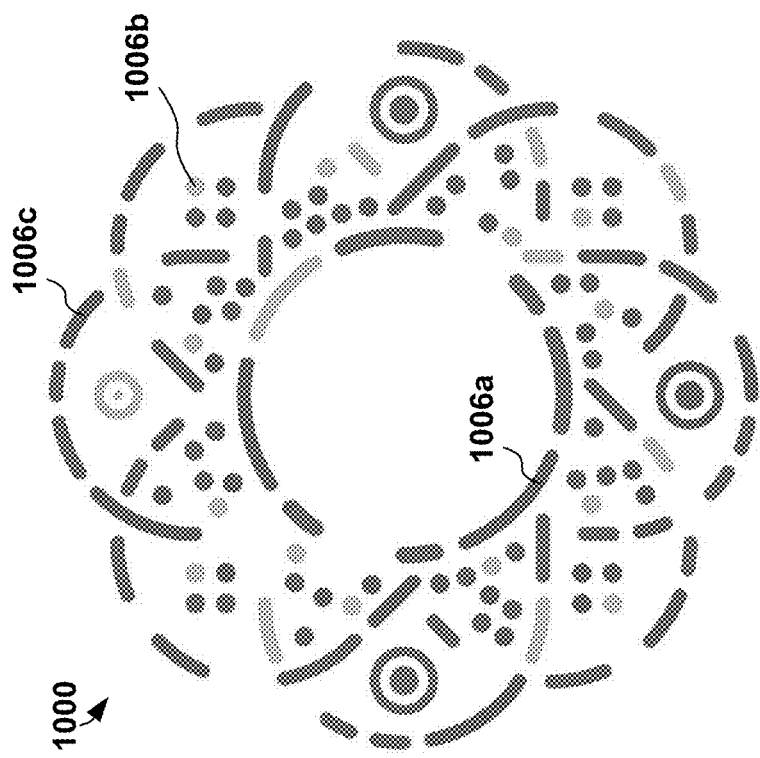
FIG. 8 depicts a machine-readable visual encoding according to example embodiments of the present disclosure.
Figure 7:
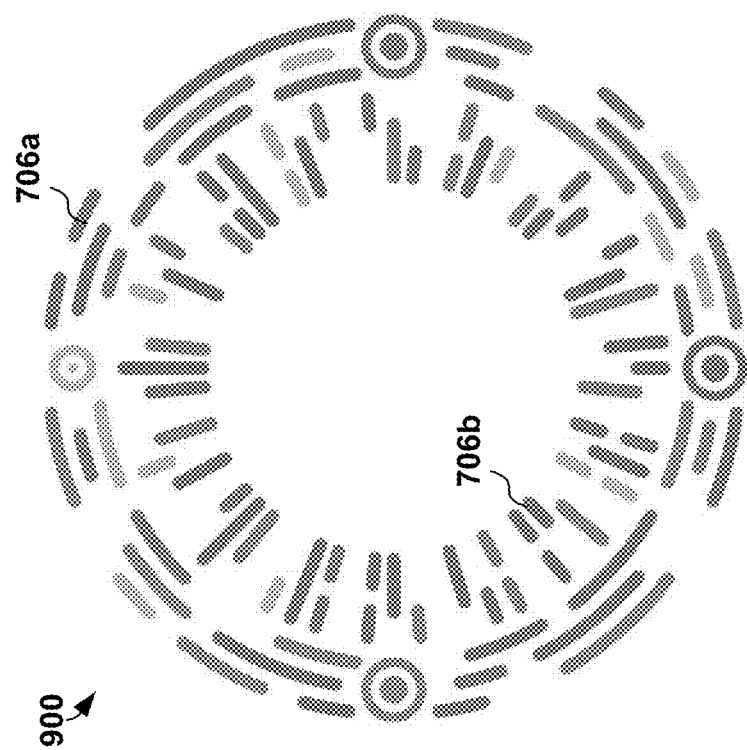
FIG. 7 depicts a machine-readable visual encoding according to example embodiments of the present disclosure.

The aforementioned features can be combined and/or rearranged to produce configurable machine-readable visual encodings, such as shown in FIGS. 7 and 8. For instance, example encoding 900 in FIG. 7 comprises both concentric rings and radially oriented line segments, as well as distributed circular shapes (e.g., for registration of orientation in image(s)). Example encoding 1000 in FIG. 8 comprises a concentric ring 1006a, shapes 1006b, and radially distributed orbits 1006c. It is also to be understood that the central areas 308 and 408 of FIGS. 2 and 3 can likewise be implemented in any of the encodings of FIGS. 1-8.

As shown in FIGS. 1-8, machine-readable visual encodings according to the present disclosure can be integrated into and form a part of substantially any desired aesthetic using discrete and/or continuous visual features for encoding data. Additionally, the configurability of machine-readable visual encodings according to the present disclosure can provide for easily recognized (by human perception and/or machine perception) classes of machine-readable visual encodings.

For instance, differences of outline, layouts, shapes used in the patterns, colors, etc., such as the differences in each of FIGS. 1-8, can correspond to different algorithms and/or standards used to generate the machine-readable visual encodings. Accordingly, the above-noted differences can indicate to one or more recognition systems the type of recognition model needed for reading the machine-readable visual encodings according to the different algorithms and/or standards used to generate the machine-readable visual encodings. In this manner, systems and methods according to embodiments of the present disclosure can offer efficient processing by deploying specifically-trained recognition model(s). However, in some embodiments, the easily perceived structural differences noted above can also be advantageously employed to assist a general encoding recognition model to quickly and accurately recognize the different classes of encodings and minimize errors due to confused classifications.

Figure 9B:
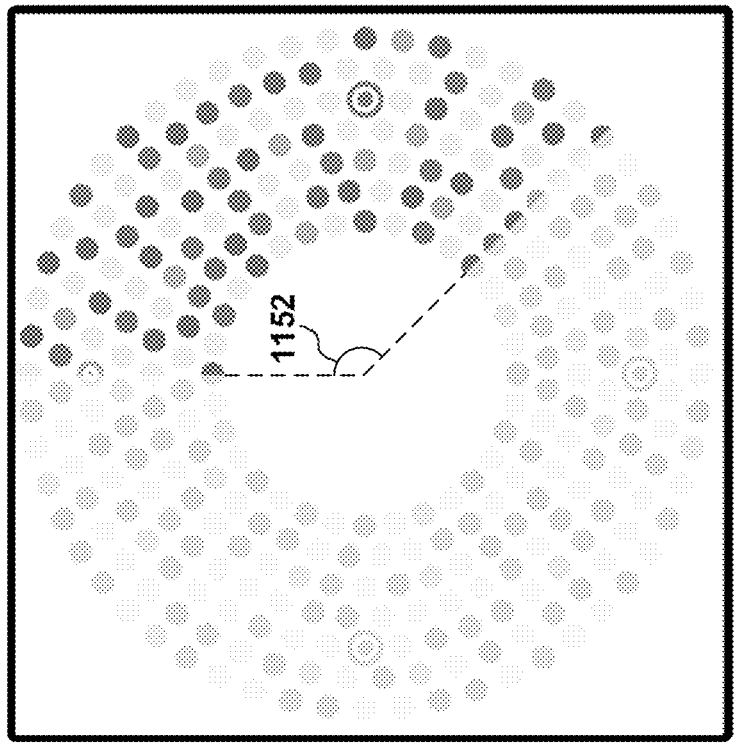
FIG. 9B depicts a progress rendering over a machine-readable visual encoding according to example embodiments of the present disclosure.
Figure 9A:
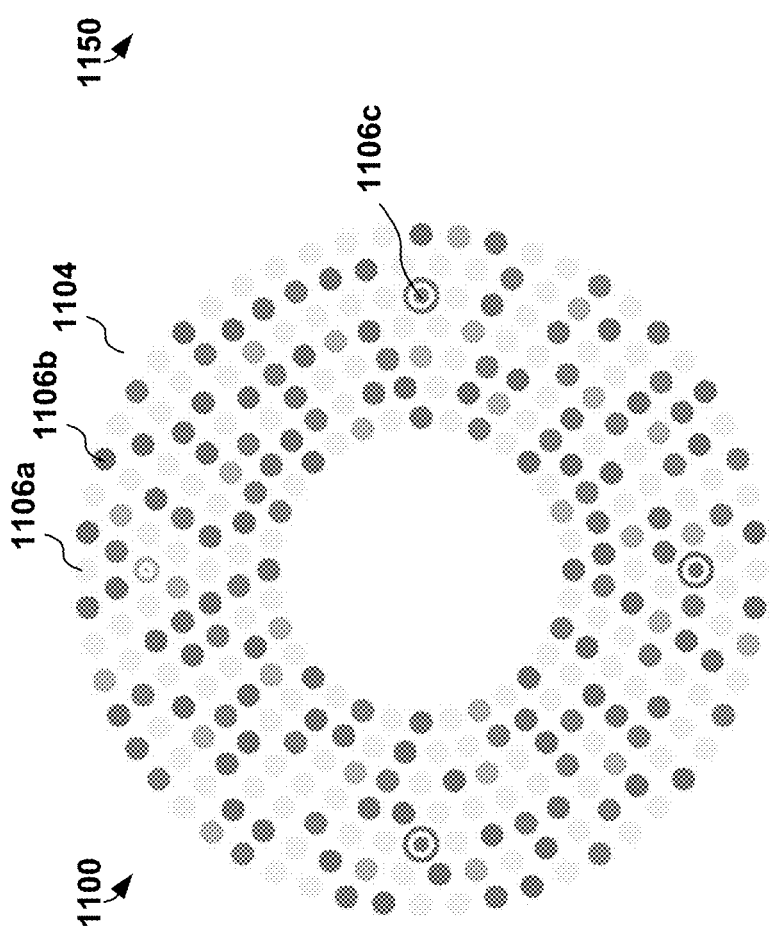
FIG. 9A depicts a machine-readable visual encoding according to example embodiments of the present disclosure.

FIG. 9A depicts another example embodiment of an encoding 1100 comprising a visual pattern 1104 employing circular shapes 1106a, 1106b to encode information, with some shapes 1106c additionally used for orientation registration purposes. In some embodiments, a user device could capture an image of the encoding 1100 and display a rendering 1150 of the image manipulated to suggest a progress indicator of the processing of the encoding 1100. For instance, as shown in FIG. 9B, a rendering 1150 can display a portion of the encoding 1150 in full color and a portion "greyed out" proportionally as the processing progresses, such that the angle 1152 sweeps from 0 degrees to 360 degrees during the processing. In some embodiments, the progress rendering 1150 can be informed by actual status updates or by estimations thereof. In some embodiments, the rendering is an augmented reality rendering, such that the progress overlay is rendered as appearing over an image of the encoding 1100 in real time (e.g., in an open app displaying the field of view of a camera on a user device). It is to be understood that any other of the example encodings from FIGS. 1-8 can also be used to display a progress rendering. Such progress renderings can sweep across an encoding in an angular fashion, linear fashion, or in a manner tracing one or more outlines of the encoding (e.g., the letterform(s) of FIG. 1).

Figure 10A:
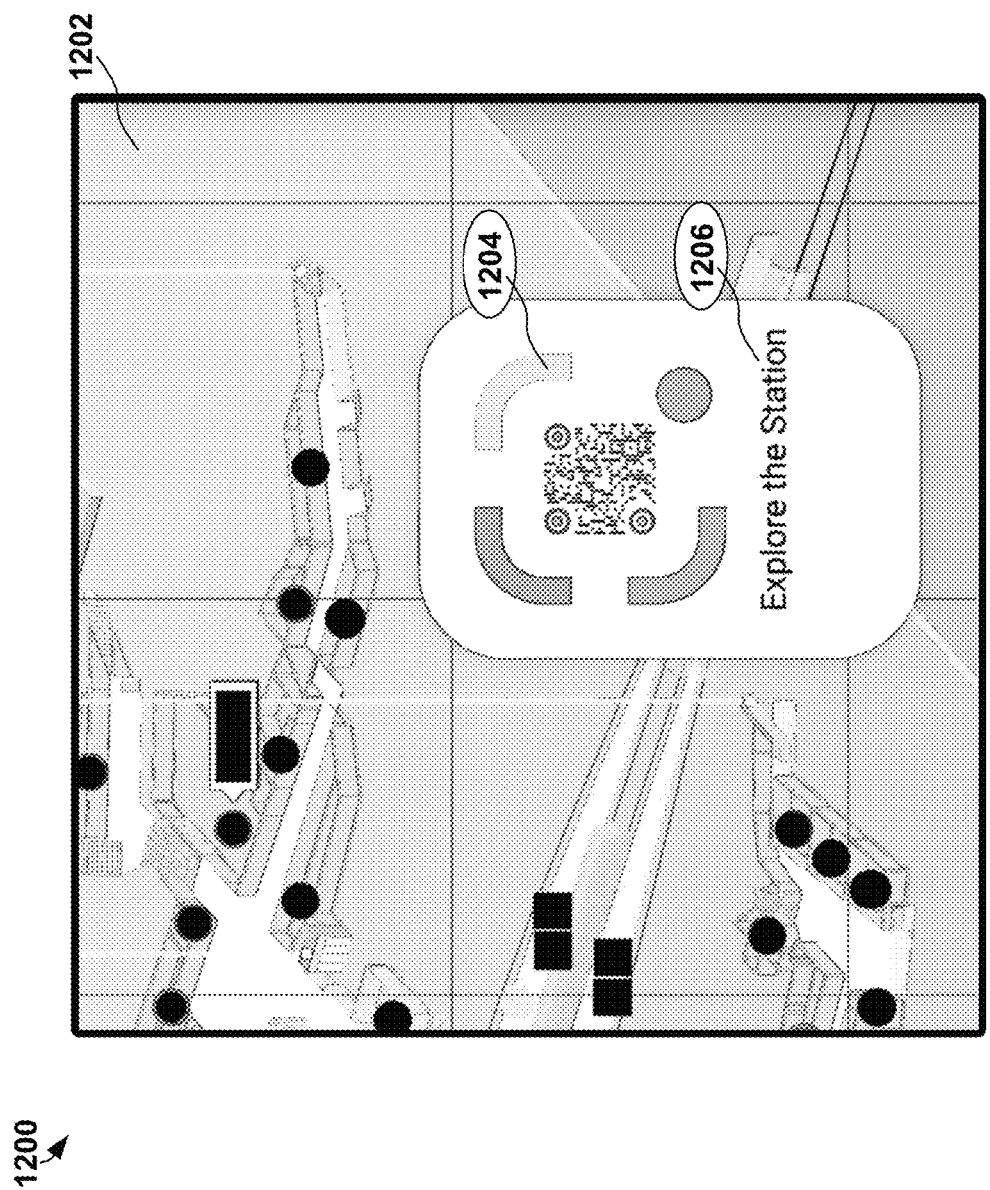
FIG. 10A depicts an image of a scene containing a machine-readable visual encoding according to example embodiments of the present disclosure.
Figure 10B:
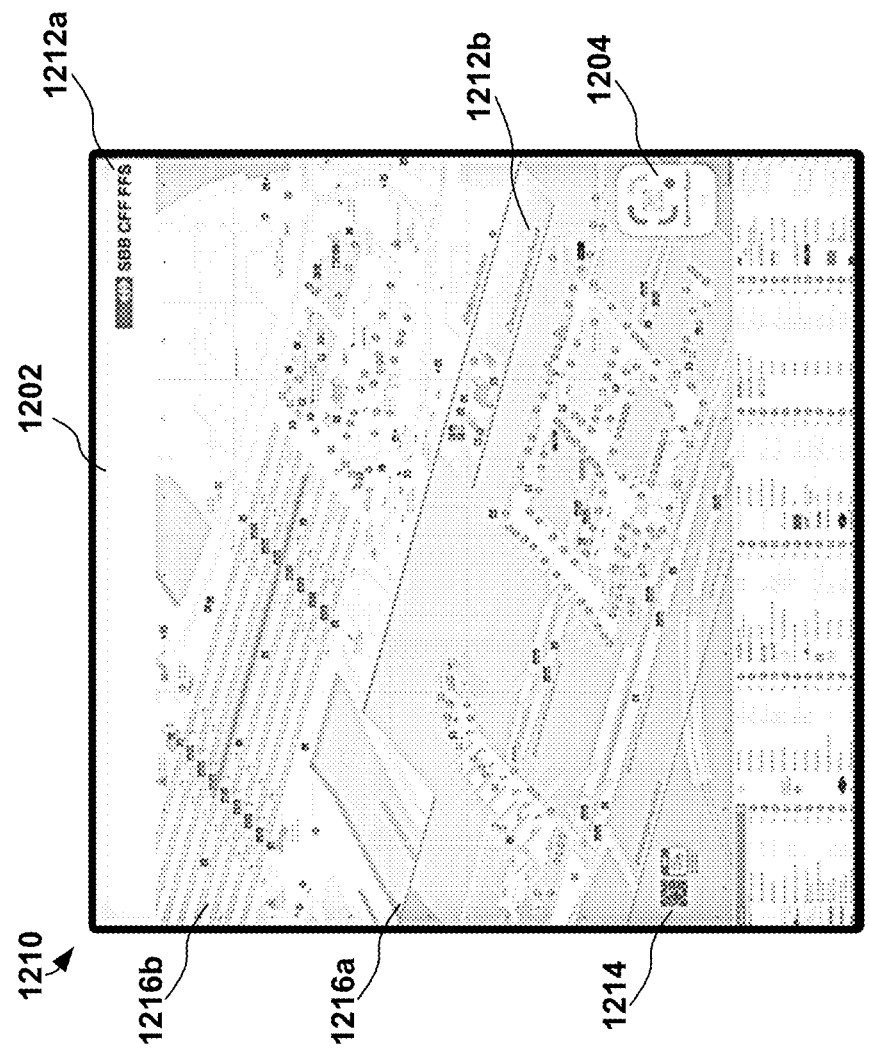
FIG. 10B depicts an image of a scene containing a machine-readable visual encoding according to example embodiments of the present disclosure.
Figure 10C:
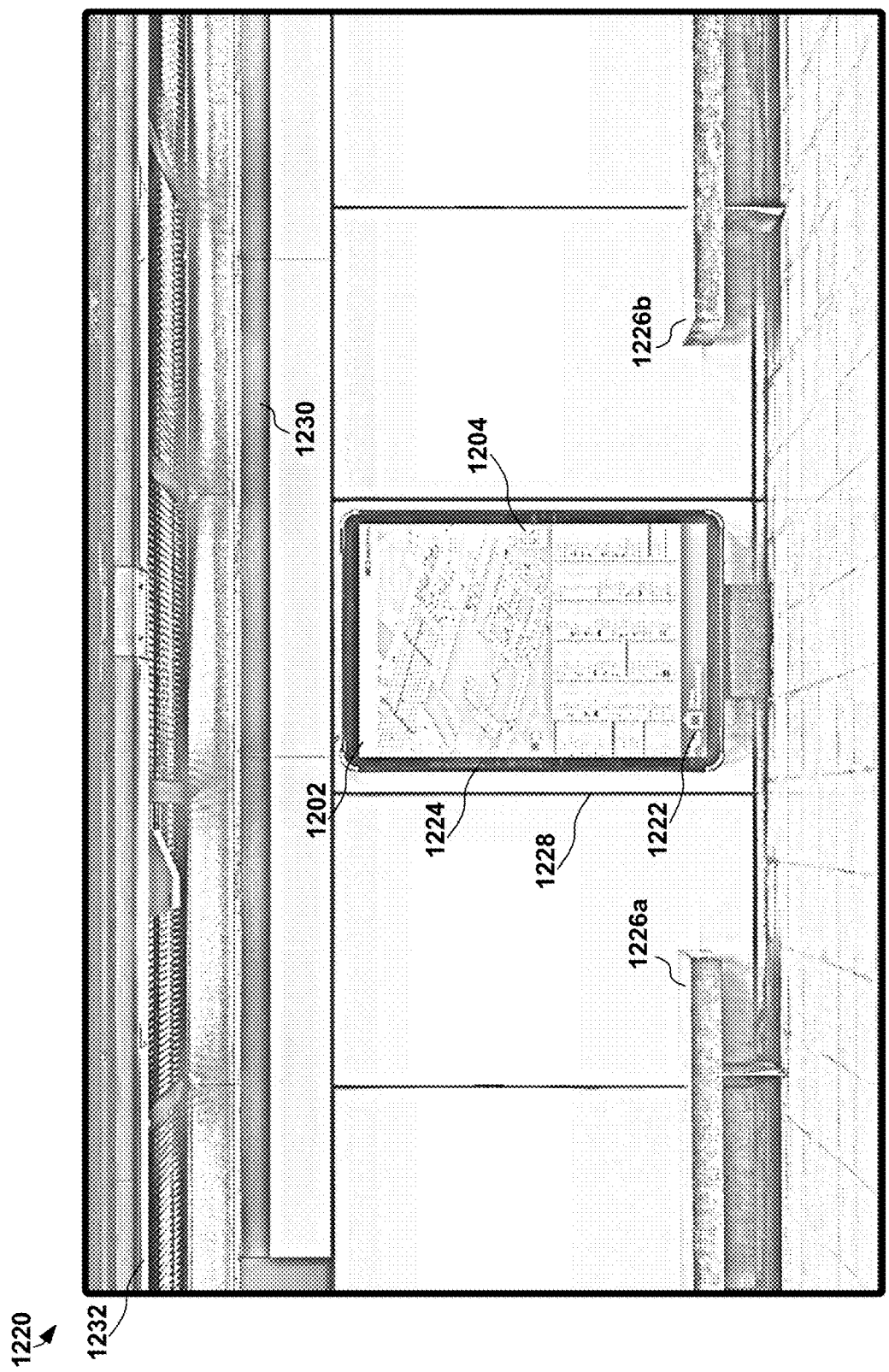
FIG. 10C depicts an image of a scene containing a machine-readable visual encoding according to example embodiments of the present disclosure.

FIGS. 10A-10C demonstrate one embodiment of aspects of the present disclosure for recognizing a machine-readable visual encoding in view of its context. FIG. 10A depicts an image 1200 of a map 1202 on which a machine-readable visual encoding 1204 is printed. Adjacent to the machine-readable visual encoding 1204 is textual material 1206. Although FIG. 10A is discussed herein in terms of a "map" that is "printed," it is to be understood that the machine-readable visual encoding 1204 could be displayed on a screen or other device as part of a larger display 1202 of substantially any form amenable to capture in image 1200.

In some embodiments, an imaging device can resolve the machine-readable visual encoding 1204 sufficiently to directly decode its contents. In some embodiments, prior to decoding the contents and/or prior to executing code communicated thereby, additional contextual information associated with the machine-readable visual encoding 1204 (e.g., within the image 1200) can be processed by one or more recognition systems. For instance, the map 1202 can be processed to recognize its identity as a map and/or one or more locations mapped thereon. In some embodiments, the textual information 1206 can be processed (e.g., via OCR and/or semantic analysis) to recognize an association between the machine-readable visual encoding 1204 and a "station." A stored reference associated with the machine-readable visual encoding 1204 can contain information associating the machine-readable visual encoding 1204 with a map, a "station," and/or one or more locations on the map. By comparison of the contextual information in the image 1200 with the stored reference, a confidence level associated with the recognition of and/or verification of the machine-readable visual encoding 1204 can be increased. In this manner, if an imaging device cannot or does not resolve the machine-readable visual encoding 1204 sufficiently to directly decode its contents (e.g., due to insufficient lighting, slow shutter speed, etc.), the increased confidence level obtained by recognition of the contextual information can enable any missing information to be "filled in" from the stored reference.

FIG. 10B depicts an image 1210 of the same map 1202 captured from a greater distance. In some embodiments, the machine-readable visual encoding 1204 may not be resolved with sufficient detail to be directly recognized. However, contextual information contained in the image 1210 can be recognized, such as, for example, the relative positioning of the machine-readable visual encoding 1204 within the map 1202; textual labels 1212a, 1212b; the presence of an additional machine-readable visual encoding 1214; and large-scale mapped features 1216a, 1216b. Each, some, or all of these contextual features may be recognized and compared with contextual data in a stored reference associated with the machine-readable visual encoding 1204. In this manner, even if an imaging device cannot or does not resolve the machine-readable visual encoding 1204 sufficiently to directly decode its contents, the recognition of the contextual information and association of the contextual information with a stored reference can enable retrieval from the stored reference of the data encoded by the encoding 1204.

FIG. 10C depicts an image 1220 of a scene containing the map 1202 on which the machine-readable visual encoding 1204 is printed. Examples of recognizable contextual features within the scene include large logos 1222; the frame 1224 in which the map 1202 hangs; nearby objects such as benches 1226a, 1226b; contrasting architectural features such as joints 1228 of wall paneling behind the map 1202; room boundaries such as the boundary 1230 between the wall and the ceiling; and lighting elements such as lights 1232. Each, some, or all of these contextual features may be recognized and compared with contextual data in a stored reference associated with the machine-readable visual encoding 1204. In this manner, even if an imaging device cannot or does not resolve the machine-readable visual encoding 1204 at all (or apart from an outline and/or borders thereof), the recognition of the contextual information and association of the contextual information with a stored reference can enable retrieval from the stored reference of the data encoded by the encoding 1204.

Figure 10D:
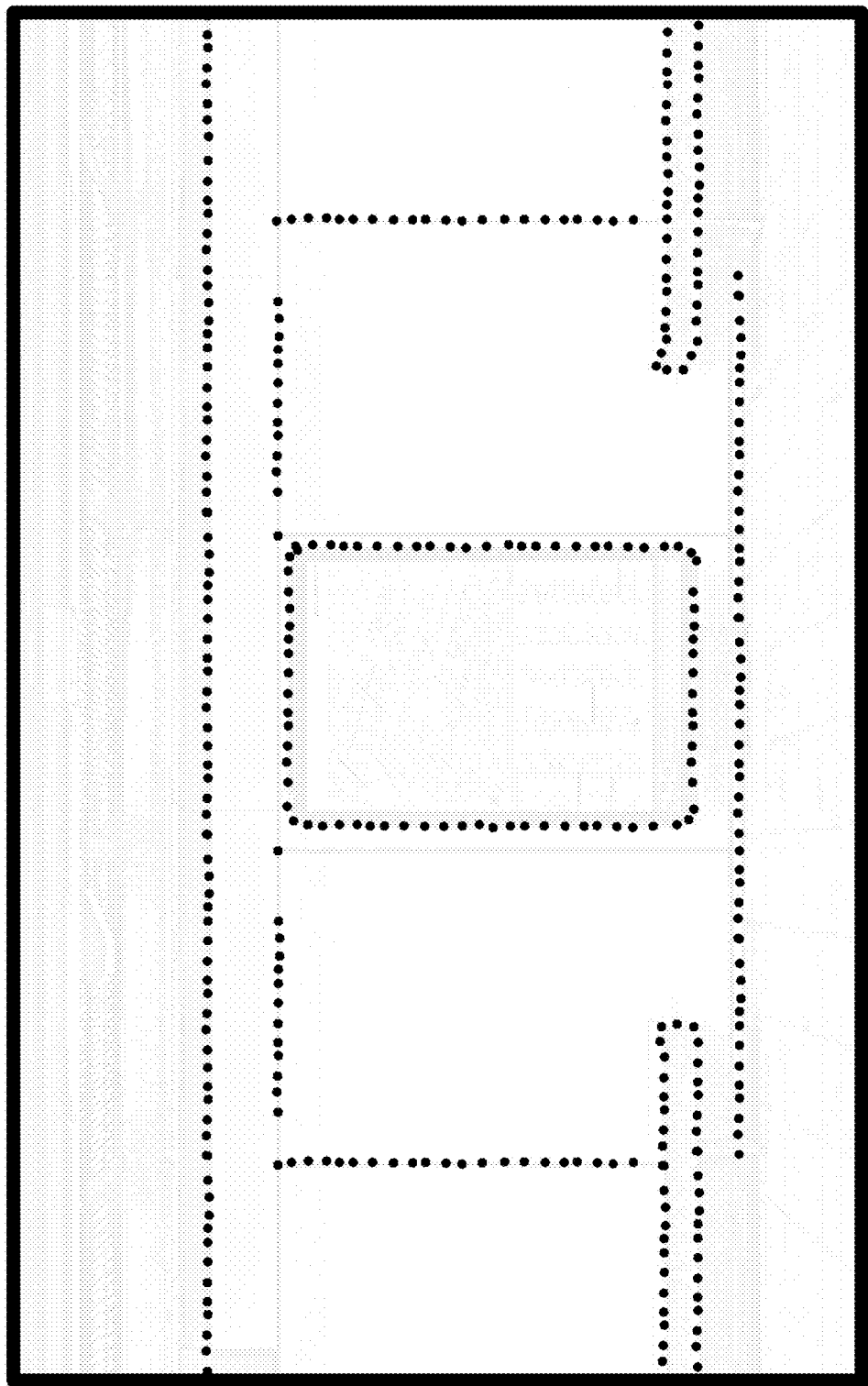
FIG. 10D depicts a mapping of features of an image of a scene containing a machine-readable visual encoding according to example embodiments of the present disclosure.

Recognition of contextual features in 3-D space, such as the room boundaries, objects, architectural features, and the like noted above, can include processing the image 1220 using a visual position system (VPS). For example, in some embodiments, the image 1220 can be processed using VPS models to detect surfaces, edges, corners, and/or other features and generate a mapping of the features (e.g., a point cloud, such as shown in FIG. 10D). Such a mapping can be packaged into the image data descriptive of the scene and/or generated by one or more recognition systems, and the mapping can be compared with data descriptive of a mapping in the stored reference. In some embodiments, a mapping (e.g., a point cloud and/or set of anchors) can be generated from the image 1220 and/or from image data associated therewith (e.g., sensor data collected descriptive of the scene, including spatial measurements from LIDAR, etc.). Additionally, or alternatively, spectral data (e.g., from an invisible portion of the electromagnetic spectrum) can be collected and used to generate a mapping. In some embodiments, multiple exposures (e.g., from multiple points in time, from multiple sensors on a device, etc.) can be combined to determine a depth mapping (e.g., via triangulation). In this manner, VPS can be used to associate an image 1220 (and/or image data descriptive thereof) with a stored reference for recognition, verification, and/or processing of a machine-readable visual encoding 1204.

Although the example embodiments depicted in FIGS. 10A-10D involve an informational display (map), it is to be understood that the systems and methods of the present disclosure can process image data descriptive of a wide variety of subjects comprising machine-readable visual encodings, such as posters, advertisements, billboards, publications, flyers, vehicles, personal mobility vehicles (e.g., scooters, bikes, etc.), rooms, walls, furniture, buildings, streets, signs, tags, pet collars, printed clothing, medical bracelets, and the like. For instance, some embodiments of systems and methods according to aspects of the present disclosure can include object recognition (e.g., product recognition) for information retrieval from web servers. For instance, image data can be captured descriptive of a scene that contains an object comprising a machine-readable visual encoding. The image data can also include contextual information surrounding the machine-readable visual encoding (e.g., other features of the object, such as images and/or text thereon) and contextual information surrounding the object (e.g., where the object is positioned, nearby objects, etc.). In some embodiments, one or more recognition systems can process the machine-readable visual encoding, and one or more other recognition systems can process the contextual data. For instance, an image recognition system can recognize and/or identify the type of object and/or the types of objects surrounding the object. In some examples, a semantic recognition system can process one or more semantic entities recognized within the scene (e.g., text and/or images on the object) to assist in the processing of the machine-readable visual encoding. Responsive to an identification of the object, information descriptive thereof can be retrieved from a web server (e.g., a web server associated with the recognition system(s)) and be rendered on a display device of a user device (e.g., a user device which captured the image data).

Figure 11A:
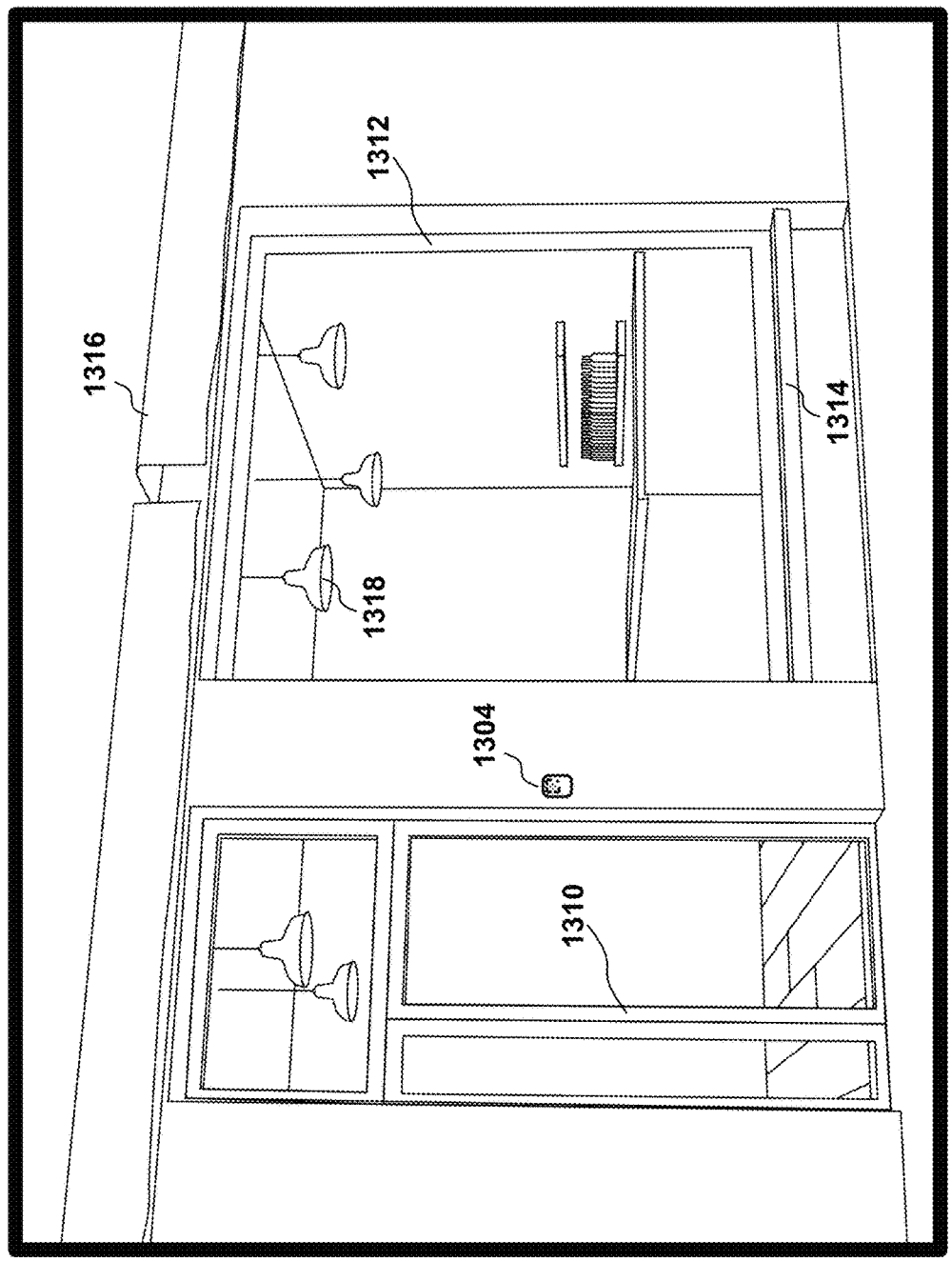
FIG. 11A depicts an image of a scene containing a machine-readable visual encoding according to example embodiments of the present disclosure.

FIG. 11A depicts another example embodiment of an image 1300 of a scene containing a machine-readable visual encoding 1304. In the depicted scene, a storefront displays the machine-readable visual encoding 1304 on an exterior wall. As discussed above, various features depicted in the scene can be recognized and/or processed for comparison with a stored reference to assist and/or complement the recognition and/or verification of the machine-readable visual encoding 1304. For instance, external architectural features can be recognized, such as a doorframe 1310, window frame 1312, windowsill 1314, and awning 1316. Additionally, internal architectural features can also be recognized, if visible, such as light features 1318.

Figure 11B:
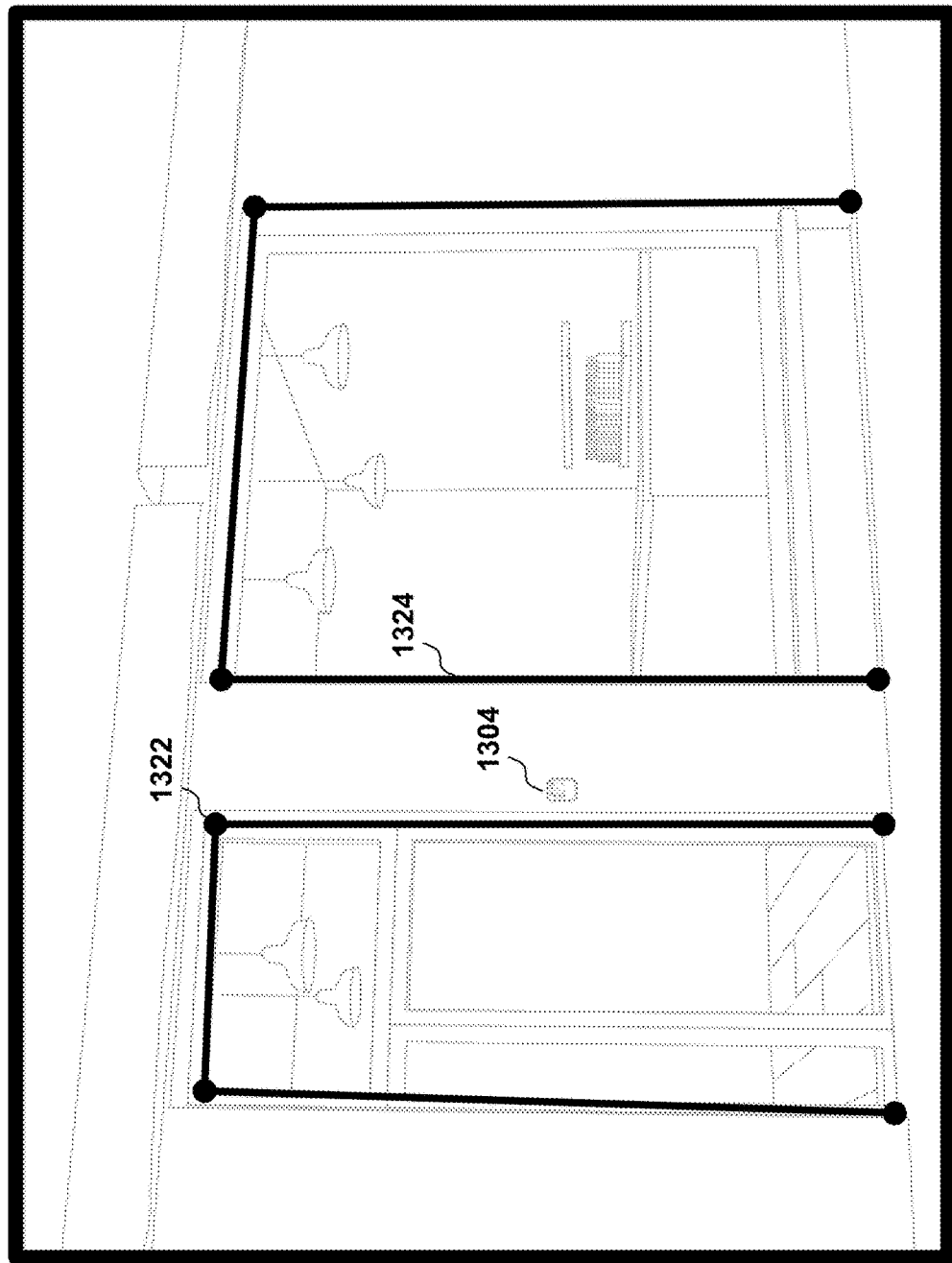
FIG. 11B depicts a mapping of features of an image of a scene containing a machine-readable visual encoding according to example embodiments of the present disclosure.

One or more of the above-mentioned features can be recognized using a VPS. For instance, a feature map 1320 can be generated as shown in FIG. 11B. In some examples, anchor points 1322 can be located and optionally connected with segments 1324 to mark and/or trace features of interest of the scene. In some embodiments, the feature map 1320 can be compared with a feature map of a stored reference to determine an association therebetween (e.g., a similarity).

In some embodiments, a feature map 1320 can be generated and stored in the stored reference based on one or more images captured of the scene. For instance, in one embodiment depicted in FIG. 11C, a user 1324 associated with a user account corresponding to the stored reference can use an imaging device (e.g., a smartphone 1326) to capture a plurality of images of the scene from a plurality of vantage points along path 1328. In this manner, image data captured from a plurality of angles can be processed to generate a robust feature map descriptive of the scene to be stored in the stored reference. Once documented, the feature map can thereafter be used for comparison with other feature maps (e.g., feature maps perhaps only generated from one vantage point) by one or more recognition systems.

Figure 11D:
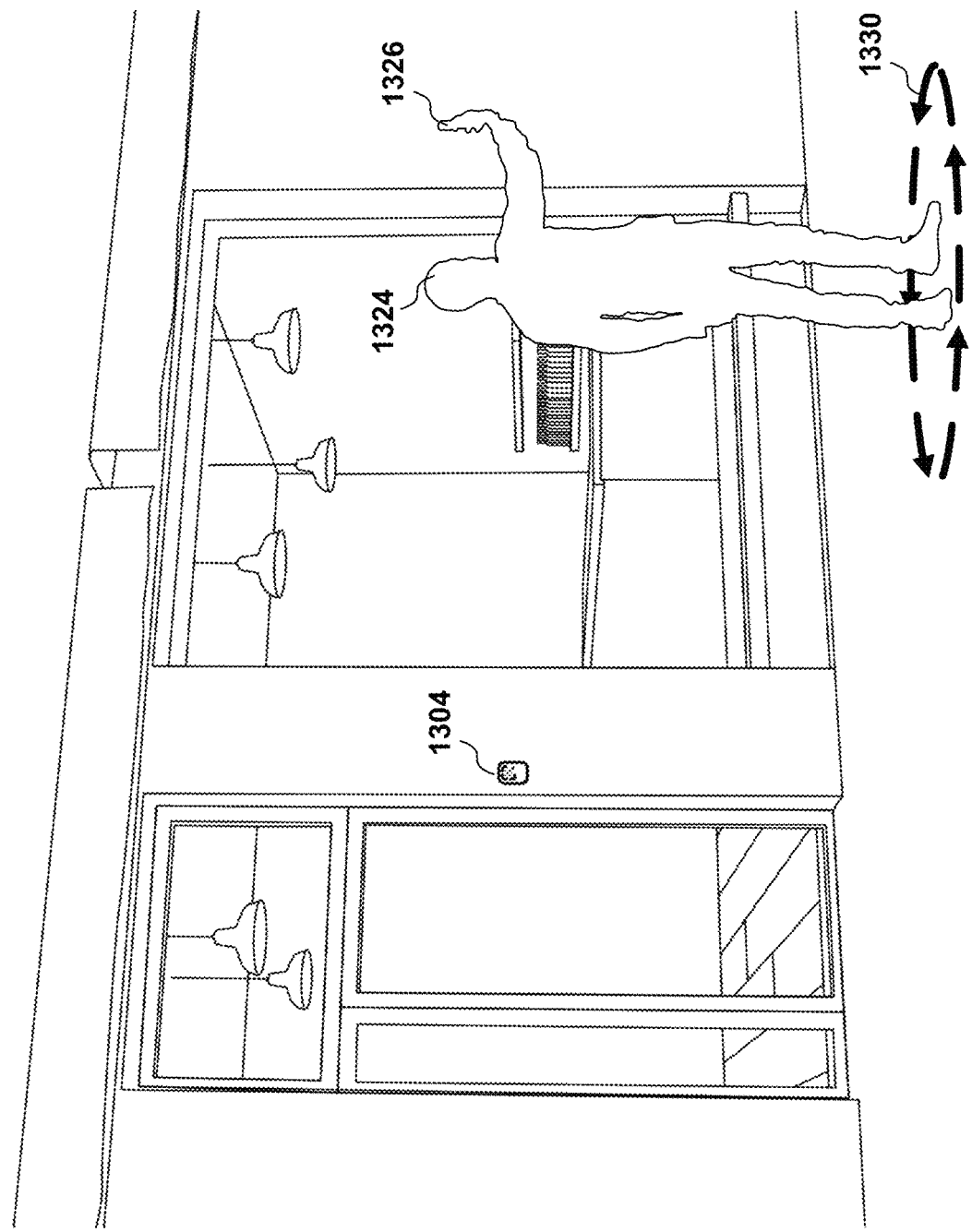
FIG. 11D depicts a user generating reference data according to example embodiments of the present disclosure.

The stored reference can also optionally contain additional contextual information about objects and structures surrounding the scene. For instance, as depicted in FIG. 11D, the user 1324 can use the imaging device 1326 to generate panoramic image data by collecting images from a plurality of vantage points along the path 1330 (e.g., by the user 1324 rotating). In this manner, feature maps may be generated, not only for the scene depicted in the image 1300 of FIG. 11A, but also additionally (if desired) for surrounding objects and structures. The stored reference associated with the machine-readable visual encoding 1304 can contain all the feature map(s) associated therewith and provide a robust set of context data for use by one or more recognition systems according to embodiments of the present disclosure.

In some embodiments, the machine-readable visual encoding 1304 may be desired to be used at one of a plurality of locations associated with the user account of the user 1324. A stored reference, in some embodiments, could contain contextual data associated with each of the plurality of locations respectively associated with sub-references.

In some embodiments, the context associated with one machine-readable visual encoding can comprise another machine-readable visual encoding. For instance, in some embodiments, processing of data communicated in one machine-readable visual encoding (e.g., execution of instructions communicated thereby) can be configured to be contingent upon the recognition of another machine-readable visual encoding in the image data.

Figure 12:
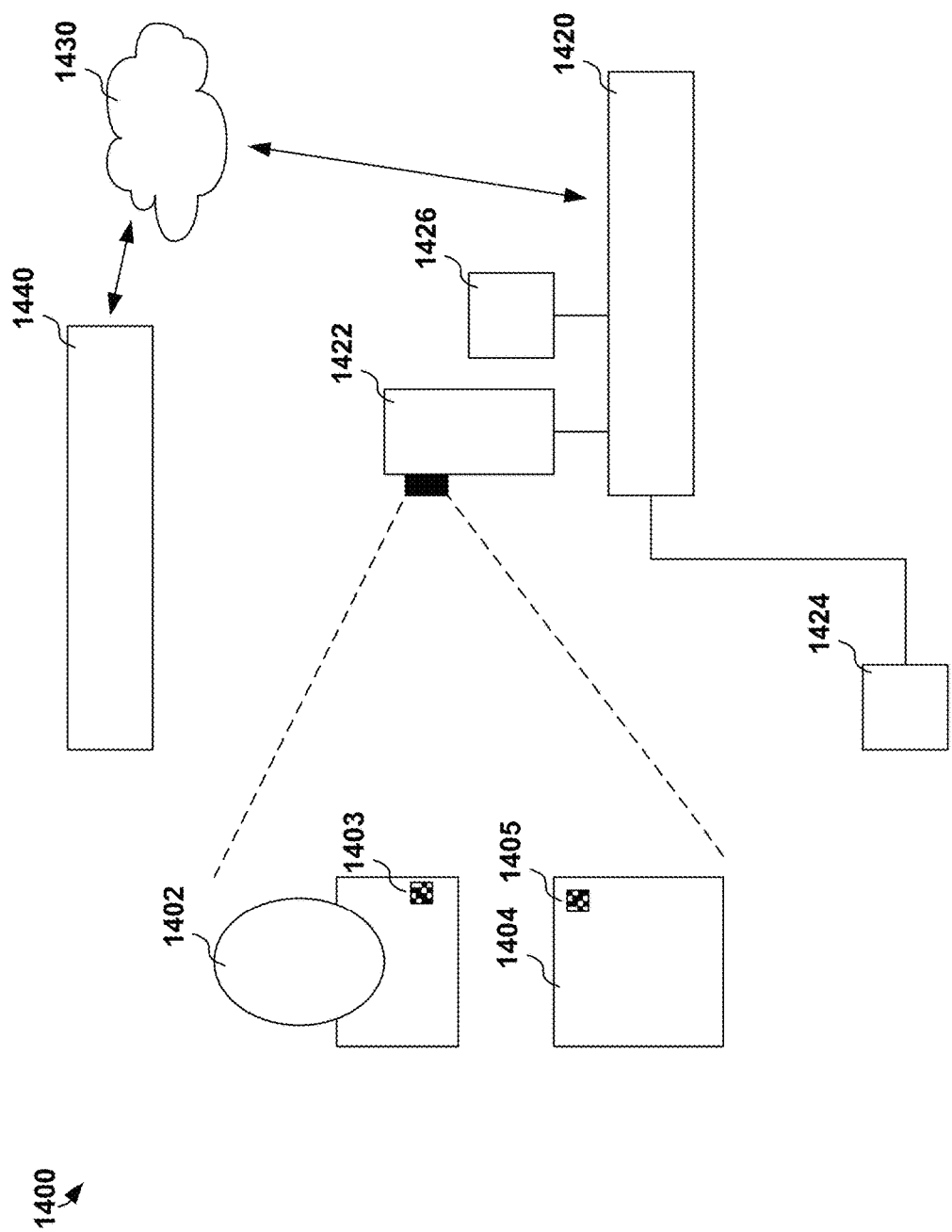
FIG. 12 depicts a package delivery system using machine-readable visual encodings according to example embodiments of the present disclosure.

For instance, in one embodiment depicted in FIG. 12, a system 1400 for secure package delivery can be implemented according to aspects of the present disclosure. For example, a delivery-person 1402 can be provided with a first machine-readable visual encoding 1403 (e.g., on a badge, on a device) and a package 1404 can be provided with a second machine-readable visual encoding 1405 (e.g., printed thereon). A "smart" home system 1420 can include a camera 1422 (e.g., doorbell camera, security camera, etc.) which can capture within its field of view a scene containing both the first machine-readable visual encoding 1403 and the second machine-readable visual encoding 1405. In some embodiments, both the first machine-readable visual encoding 1403 and the second machine-readable visual encoding 1405 can be required to be matched to a given level of confidence before a "smart" lock 1424 can permit access to a secure area for storing the package 1404 (e.g., a package locker, a garage area, a front porch, a front door, etc.). In some embodiments, additional "smart" component(s) 1426 can provide additional contextual information (e.g., time of delivery, expected time of delivery, expected package dimensions, expected number of packages, any override preventing the granting of access, weather conditions which may influence imaging distortion(s), 3-D imaging data to prevent spoofing with printed images of packages, etc.). The home system 1420 can optionally be connected to a network 1430 for communication of image data (e.g., for processing recognition tasks on a server 1440) and/or for receiving reference information for local processing of one or more recognition tasks (e.g., receiving the expected parameters of machine-readable visual encoding 1403 and/or facial recognition data for verifying identity of delivery-person 1402, etc.). In some embodiments, the first machine-readable visual encoding 1403 can be generated to provide limited access for only a window of time. For instance, the data descriptive of the machine-readable visual encoding 1403 (including any window of time associated therewith) can be stored in a stored reference on the server 1440 and optionally transmitted to the home system 1420. In this manner, access may be granted in some embodiments only to verified individuals, only when the individuals are in possession of a verified package, and only when the individuals do so at an appointed time.

Figure 13A:
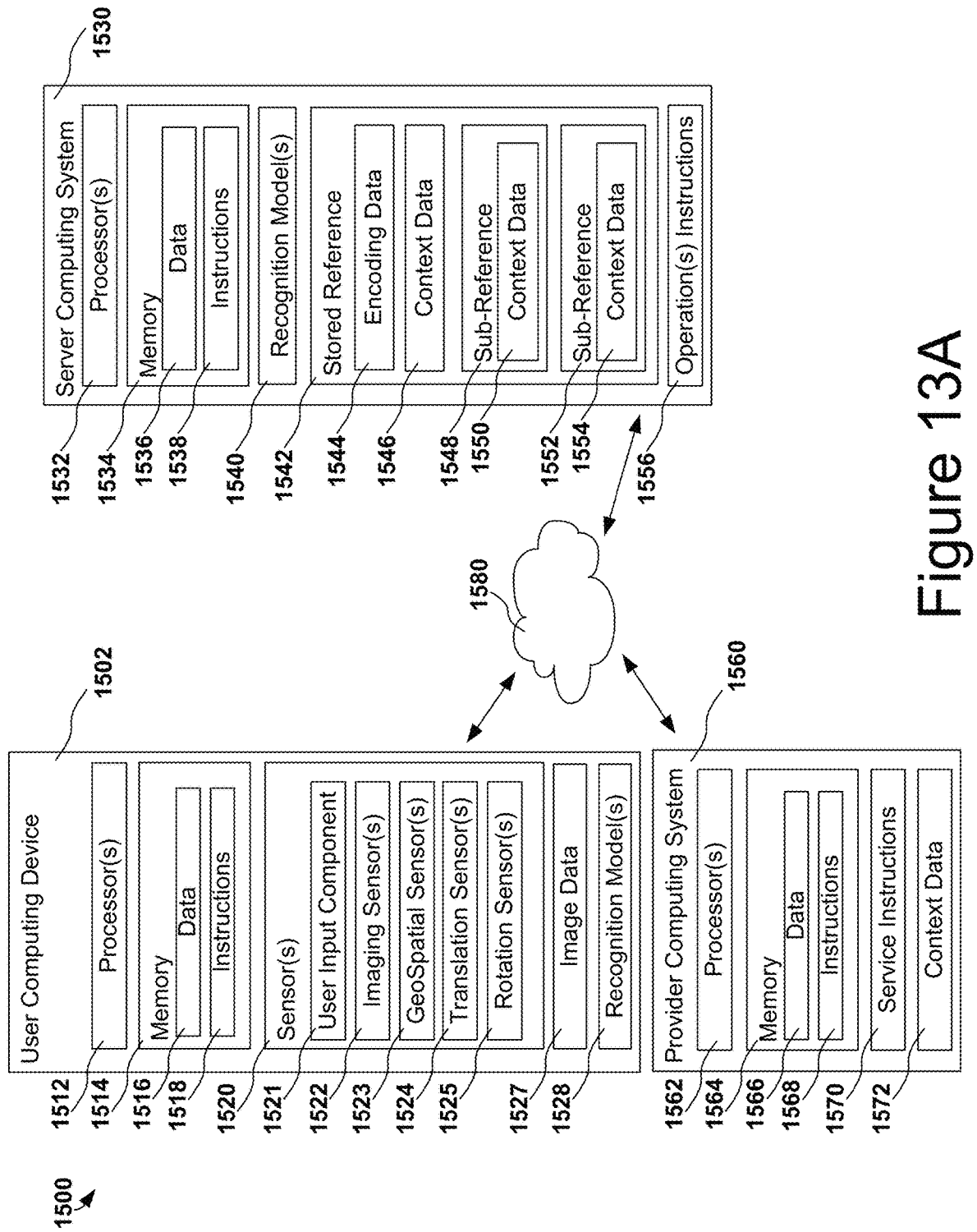
FIG. 13A depicts a block diagram of an example computing system according to example embodiments of the present disclosure.

FIG. 13A depicts a block diagram of an example computing system 1500 that recognizes and/or processes machine-readable visual encodings according to example embodiments of the present disclosure. The system 1500 includes a user computing device 1502, a server computing system 1530, and a provider computing system 1560 that are communicatively coupled over a network 1580.

The user computing device 1502 can be any type of computing device, such as, for example, a personal computing device (e.g., laptop or desktop), a mobile computing device (e.g., smartphone or tablet), a gaming console or controller, a wearable computing device (e.g., computer-enabled eyeglasses, watch, etc.), an embedded computing device, or any other type of computing device.

The user computing device 1502 includes one or more processors 1512 and a memory 1514. The one or more processors 1512 can be any suitable processing device (e.g., a processor core, a microprocessor, an ASIC, a FPGA, a controller, a microcontroller, etc.) and can be one processor or a plurality of processors that are operatively connected. The memory 1514 can include one or more non-transitory computer-readable storage mediums, such as RAM, SRAM, DRAM, ROM, EEPROM, EPROM, flash memory devices, magnetic disks, etc., and combinations thereof. The memory 1514 can store data 1516 and instructions 1518 which are executed by the processor 1512 to cause the user computing device 1502 to perform operations.

The user computing device 1502 can also include one or more sensors 1520. For instance, the user computing device 1502 can include a user input component 1521 that receives user input. For example, the user input component 1521 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input. The user computing device 1502 can include one or more imaging sensors 1522 (e.g., CCD, CMOS, RADAR, LIDAR, etc.). The imaging sensor(s) 1522 may each be the same or different, and each may be configured with one or more different lens configurations. One or more imaging sensors may be positioned on one side of the user computing device 1502 and one or more imaging sensors may be positioned on an opposing side of the user computing device 1502. The imaging sensor(s) can include sensors which capture a broad range of the visible and/or the invisible light spectrum. The user computing device 1502 can also include one or more geospatial sensors 1523 (e.g., GPS) for measuring, recording, and/or interpolating location data. The user computing device 1502 can also include one or more translation sensors 1524 (e.g., accelerometers, etc.) and one or more rotation sensors 1525 (e.g., inclinometers, gyroscopes, etc.). In some embodiments, the one or more geospatial sensors 1523, the one or more translation sensors 1524, and one or more rotation sensors 1525 can work cooperatively to determine and record a position and/or orientation of the device 1502, and in combination with the one or more imaging sensors 1522, determine a pose of the device 1502 with respect to an imaged scene.

The user device 1502 can also comprise image data 1527 collected and/or generated using any or all of the sensor(s) 1520. The user device 1502 can also comprise one or more recognition models 1528 for performing recognition task(s) on the collected image data 1527. For example, the recognition models 1528 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more recognition models 1528 can be received from the server computing system 1530 over network 1580, stored in the user computing device memory 1514, and then used or otherwise implemented by the one or more processors 1512. In some implementations, the user computing device 1502 can implement multiple parallel instances of a single recognition model 1528 (e.g., to perform parallel recognition tasks, such as to perform recognition tasks on portions of the image data 1527 descriptive of a machine-readable visual encoding and recognition tasks on portions of the image data 1527 descriptive of contextual data).

Additionally, or alternatively, one or more recognition models 1540 can be included in or otherwise stored and implemented by the server computing system 1530 that communicates with the user computing device 1502 according to a client-server relationship. The server computing system 1530 includes one or more processors 1532 and a memory 1534. The one or more processors 1532 can be any suitable processing device (e.g., a processor core, a microprocessor, an ASIC, a FPGA, a controller, a microcontroller, etc.) and can be one processor or a plurality of processors that are operatively connected. The memory 1534 can include one or more non-transitory computer-readable storage mediums, such as RAM, SRAM, DRAM, ROM, EEPROM, EPROM, flash memory devices, magnetic disks, etc., and combinations thereof. The memory 1534 can store data 1536 and instructions 1538 which are executed by the processor 1532 to cause the server computing system 1530 to perform operations. In some implementations, the server computing system 1530 includes or is otherwise implemented by one or more server computing devices. In instances in which the server computing system 1530 includes plural server computing devices, such server computing devices can operate according to sequential computing architectures, parallel computing architectures, or some combination thereof.

In some examples, the recognition models 1540 can be implemented by the server computing system 1540 as a portion of a web service (e.g., a machine-readable visual encoding recognition and/or verification service). Thus, one or more recognition models 1528 can be stored and implemented at the user computing device 1502 and/or one or more recognition models 1540 can be stored and implemented at the server computing system 1530. For instance, one or more recognition tasks can be shared and/or distributed among the one or more recognition models 1528 and the one or more recognition models 1540.

In some examples, the user computing device 1502 transmits image data 1527 via the network 1580 to the server computing system 1530 for recognition and/or processing of any machine-readable visual encodings described in the image data 1527. The server computing system 1530 can process the image data 1527 using the one or more recognition models 1540 to associate the image data 1527 with a stored reference 1542.

In some embodiments, the stored reference 1542 can correspond to encoding data 1544 which can assist in the decoding of the machine-readable visual encoding(s) in the image data 1527 (e.g., by indicating one or more specific encoding recognition models to be used, by detailing the algorithm used to generated/interpret the machine-readable visual encoding(s), such as one or more of the encoding schemes demonstrated in FIGS. 1-11A, etc.). In some embodiments, the stored reference can comprise general context data 1546 relating to the entire stored reference 1542. For instance, the stored reference 1542 can relate to a plurality of machine-readable visual encodings. In one example embodiments, each of the encodings can be installed on instances of a particular kind of object or structure (e.g., a device, a map, an advertisement, a scooter, a car, a wall, a building, etc.). Each of the instances may share some amount of contextual information, such that a scene containing each of the encodings will share at least some overlapping context (e.g., an image of each encoding will depict at least a portion of a scooter, a map of a particular location, a particular advertisement, a particular logo, such as a logo or photo incorporated into the machine-readable visual encoding as described herein, etc.). The general context data 1546 can contain information descriptive of the shared context among the encodings.

In some embodiments, the stored reference 1542 can contain context data 1550 associated with a first sub-reference 1548, and optionally context data 1554 associated with a second sub-reference 1552. Sub-references 1548, 1552 can, in some embodiments, be used to categorize contextual information associated with subsets of a plurality of encodings associated with a stored reference 1542. For instance, to continue using the language of previously described embodiments, subsets of a plurality of encodings respectively corresponding to various subsets of instances of a particular kind of object or structure can be associated with one or more sub-references. For example, each instance of an object or structure (e.g., each scooter, each restaurant location, etc.) can be associated with its own context (e.g., location information, appearance, etc.) that can be respectively stored in context data 1550, 1554. In this manner, the machine-readable visual encoding 1542 can be associated with a stored reference 1542 (e.g., corresponding to an entity, user account, project, category, etc.) and sub-reference 1548, 1552 (e.g., corresponding to a particular implementation, application, etc.).

Upon association, the server computing system 1530 can initiate operations according to operation instructions 1556. In some embodiments, each stored reference 1542 and/or sub-reference 1548, 1552 can correspond to the same or different operation instructions 1556. In some embodiments, the operation instructions 1556 include verifying the machine-readable visual encoding(s) described by the image data 1527. Verifying can include, for example, transmitting a verification indicator to the user computing device 1502, responsive to which the user computing device 1502 can perform additional operations (e.g., processing any data items encoded in the machine-readable visual encoding). For instance, a verification indicator can comprise security credentials required for processing data encoded in the machine-readable visual encoding. The security credentials, in some embodiments, may be required by the user computing device 1502 (e.g., by an application stored and/or executed on the user computing device 1502, by a web server via a browser interface executed on the user computing device 1502, etc.). For instance, in the system 1400 for the secure delivery of packages shown in FIG. 12, the "smart" home system 1420 could, in some embodiments, require such security credentials before a "smart" lock 1424 permits access to a secure area for storing the package 1404. With reference again to FIG. 13A, in some embodiments, the security credentials may be required by a provider computing system 1560 for accessing a service provided by the provider computing system 1560 (e.g., for initiating a secured connection with the provider computing system 1560).

In some embodiments, the user device 1502 can be configured to process only the machine-readable visual encoding(s) which are verified by the server computing system. In some embodiments, when a user device 1502 images one or more machine-readable visual encodings which are not associated with any stored reference, or which are partially associated with a stored reference but whose context conflicts with the context data 1546, 1550, 1554 stored in the stored reference, the user device 1502 can be configured to display a warning message indicative thereof. For instance, a user of the user device 1502 may be prompted to accept and/or dismiss a message (e.g., a message rendered on a display of the user device) indicating the lack of verification of the machine-readable visual encoding(s) before proceeding to process data encoded thereby.

In some embodiments, verifying can include transmitting a verification indicator to a provider computing system 1560 via the network 1580. A provider computing system 1560 can be associated with one or more machine-readable visual encodings (e.g., as may be described in the image data 1527). For instance, one or more machine-readable visual encodings can be generated to communicate data (e.g., information, instructions) for interacting with a service of an entity associated with the provider computing system 1560.

The provider computing system 1560 includes one or more processors 1562 and a memory 1564. The one or more processors 1562 can be any suitable processing device (e.g., a processor core, a microprocessor, an ASIC, a FPGA, a controller, a microcontroller, etc.) and can be one processor or a plurality of processors that are operatively connected. The memory 1564 can include one or more non-transitory computer-readable storage mediums, such as RAM, SRAM, DRAM, ROM, EEPROM, EPROM, flash memory devices, magnetic disks, etc., and combinations thereof. The memory 1564 can store data 1566 and instructions 1568 which are executed by the processor 1562 to cause the provider computing system 1560 to perform operations. In some implementations, the provider computing system 1560 includes or is otherwise implemented by one or more server computing devices. In some embodiments, the provider computing system 1560 comprises the server computing system 1530.

The provider computing system 1560 can also contain service instructions 1570 for providing a service, such as, for example, a service to a user of a user computing device 1502. In some embodiments, the provider computing system 1560 commences the provision of a service responsive to an indicator indicating that the user computing device 1502 has captured and/or otherwise processed a verified machine-readable visual encoding. For instance, the provider computing system 1560 can provide a service associated with a particular instance of a machine-readable visual encoding based on an indicator from the server computing system 1530 that the image data 1527 contains contextual data associated with a stored reference 1542 or sub-reference 1548, 1552 associated with the particular instance. In this manner, for example, the provider computing system 1562 can tailor or otherwise improve the service provided.

In some embodiments, the service instructions 1570 can include executable instructions for executing an application on the user device 1502. In some embodiments, a user of the user device 1502 can scan a machine-readable visual encoding according to aspects of the present disclosure to download or otherwise obtain access to executable code for executing an application (or processes within an application).

In some embodiments, context data 1572 can be generated and/or stored on the provider computing system 1562 and/or sent to the server computing system 1530. In some embodiments, the context data 1572 can be used to update the context data 1546, 1550, 1554. In some embodiments, the context data 1572 can be used to verify the authenticity of the image data 1527. For instance, the provider computing system 1560 can be configured to provide a service associated with a particular instance of a machine-readable visual encoding, and the particular instance of a machine-readable visual encoding can correspond to the context data 1572. In some embodiments, the context data 1572 can be generated to ensure that image data 1527 can be processed to initiate a unique transaction. For example, in one embodiment, a set of context data 1572 can be generated that must be described by the image data 1527 in order to be verified by the server computing system 1530. For instance, a provider computing system 1560 can generate a visual pattern to be displayed nearby or along with a target machine-readable visual encoding (e.g., a complementary machine-readable visual encoding) or other context that is capable of being perceived by the one or more sensors 1520. In such examples, the verifying, by the server computing system 1530, can be contingent on both the target machine-readable visual encoding and the complementary machine readable visual encoding being described by image data 1527. In one example, a complementary machine readable visual encoding can be used in an embodiment of a system 1400 for secure package delivery as shown in FIG. 12.

Although examples described above have referred to the recognition and/or processing of any machine-readable visual encodings described in the image data 1527 by the server computing system 1530, it is to be understood that recognition tasks can be distributed between the user computing device 1502 and the server computing system 1530. For example, the user computing device 1502 can use one or more recognition models 1528 to process one or more portions of the image data 1527 and send the same and/or different portions of the image data 1527 to the server computing system 1530 for processing of the image data 1527 thereby, the server computing system 1530 using the one or more recognition models 1540. In some embodiments, the one or more recognition models 1528 can include an encoding recognition model for recognizing any machine-readable visual encodings described by image data 1527. In some embodiments, based on the processing of the image data 1527 by the user computing device 1502 using an encoding recognition model, the user computing device 1502 can communicate the image data 1527 via the network 1580 to the server computing system 1530 for additional processing.

For instance, in one example, the user computing device 1502 can determine that one or more machine-readable visual encodings are described by the image data 1527. The user computing device 1502 can process the image data 1527 using an encoding recognition model to decode the machine-readable visual encodings. The user computing device 1502 can transmit data descriptive of the machine-readable visual encodings (e.g., image data 1527 and/or the decoded data from the encoding itself) to the server computing device 1530 to determine whether there is a stored reference associated (or likely to be associated) with the machine-readable visual encodings. The association can be made by the server computing system 1530 by processing the data sent thereto, the data descriptive of the machine-readable visual encodings (e.g., image data 1527 and/or the decoded data from the encoding itself). If there is a stored reference 1542 associated with the machine-readable visual encodings, the server computing system can transmit the stored reference 1542 and/or context data associated therewith to the user computing device 1502 for comparison to the image data 1527 (e.g., general context data 1546 and/or context data 1550, 1554 specific to one or more sub-references 1548, 1552). In such embodiments, contextual data collected by the user computing device 1502 can remain on-device (e.g., to achieve additional privacy, lower latency, etc.).

In some examples, the one or more recognition models 1528 and the one or more recognition models 1540 can be or can otherwise include various machine-learned models. Example machine-learned models include neural networks or other multi-layer non-linear models. Example neural networks include feed forward neural networks, deep neural networks, recurrent neural networks, and convolutional neural networks.

The machine-learned models can be trained using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations. In some implementations, performing backwards propagation of errors can include performing truncated backpropagation through time. A model trainer can perform a number of generalization techniques (e.g., weight decays, dropouts, etc.) to improve the generalization capability of the models being trained. In particular, the model trainer can train the model(s) based on a set of training data. The training data can include, for example, machine-readable visual encodings, image data descriptive thereof, image data descriptive of In some implementations, if the user has provided consent, the training examples can be provided by the user computing device 1502. Thus, in such implementations, the model 1528 provided to the user computing device 1502 can be trained by a training computing system on user-specific data received from the user computing device 1502. In some instances, this process can be referred to as personalizing the model.

A model trainer can include computer logic utilized to provide desired functionality. The model trainer can be implemented in hardware, firmware, and/or software controlling a general purpose processor. For example, in some implementations, the model trainer includes program files stored on a storage device, loaded into a memory and executed by one or more processors. In other implementations, the model trainer includes one or more sets of computer-executable instructions that are stored in a tangible computer-readable storage medium such as RAM hard disk or optical or magnetic media.

In some implementations, an input (e.g., an input, data, and/or training example) to the machine-learned recognition model(s) of the present disclosure (e.g., a contained in any one of a user computing device 1502, a server computing system 1530, etc.) can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, an input (e.g., an input, data, and/or training example) to the machine-learned recognition model(s) of the present disclosure (e.g., a contained in any one of a user computing device 1502, a server computing system 1530, etc.) can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a re-clustering output. As another example, the machine-learned model(s) can process the latent encoding data to generate a prediction output.

In some implementations, an input (e.g., an input, data, and/or training example) to the machine-learned recognition model(s) of the present disclosure (e.g., a contained in any one of a user computing device 1502, a server computing system 1530, etc.) can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, an input (e.g., an input, data, and/or training example) to the machine-learned recognition model(s) of the present disclosure (e.g., a contained in any one of a user computing device 1502, a server computing system 1530, etc.) can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

The network 1580 can be any type of communications network, such as a local area network (e.g., intranet), wide area network (e.g., Internet), or some combination thereof and can include any number of wired or wireless links. In general, communication over the network 1580 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 13A illustrates one example computing system that can be used to implement the present disclosure. Other computing systems can be used as well. For example, in some implementations, the user computing device 1502 can include a model trainer and a training dataset. In such implementations, the models 1528, 1540 can be both trained and used locally at the user computing device 1502. In some of such implementations, the user computing device 1502 can implement the model trainer to personalize the model(s) 1528 based on user-specific data.

Figure 13B:
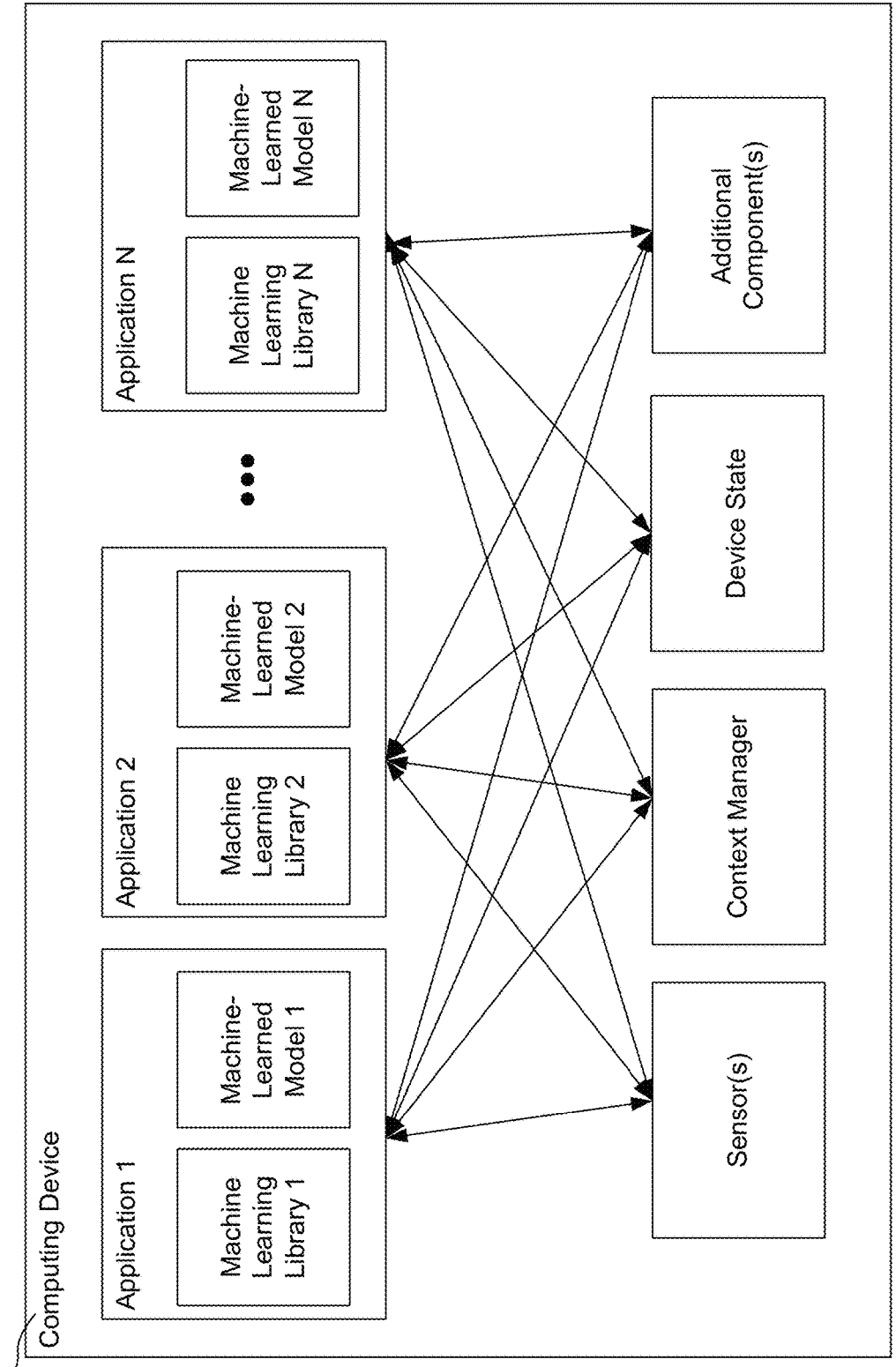
FIG. 13B depicts a block diagram of an example computing device according to example embodiments of the present disclosure.

FIG. 13B depicts a block diagram of an example computing device 1582 that performs according to example embodiments of the present disclosure. The computing device 1582 can be a user computing device or a server computing device.

The computing device 1582 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 13B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 13C:
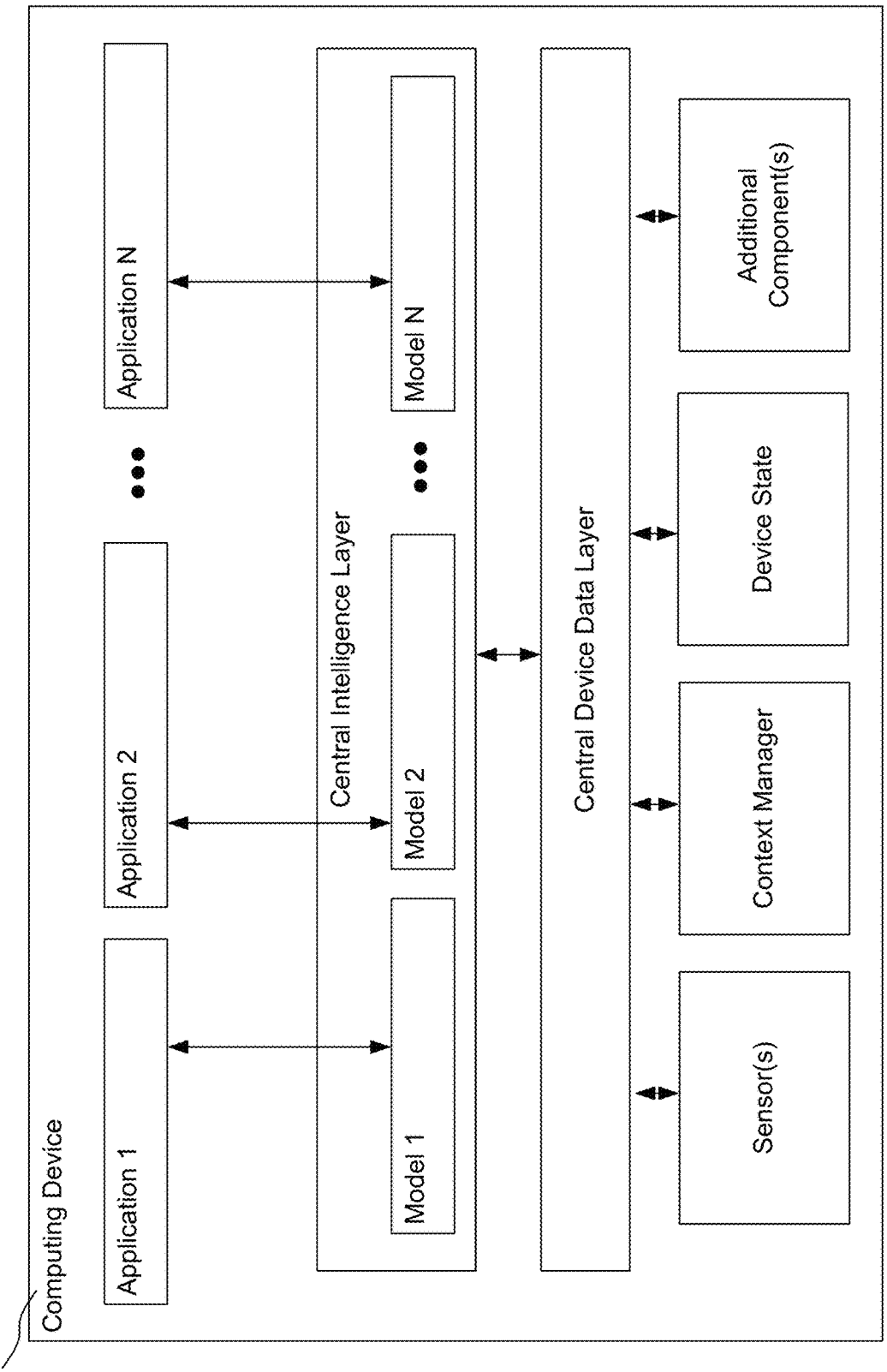
FIG. 13C depicts a block diagram of an example computing device according to example embodiments of the present disclosure.

FIG. 13C depicts a block diagram of an example computing device 1584 that performs according to example embodiments of the present disclosure. The computing device 1584 can be a user computing device or a server computing device.

The computing device 1584 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 13C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 1584.

The central intelligence layer can communicate with a central device data layer. The central device data layer can be a centralized repository of data for the computing device 1584. As illustrated in FIG. 13C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Recognition System Arrangements

Figure 13D:
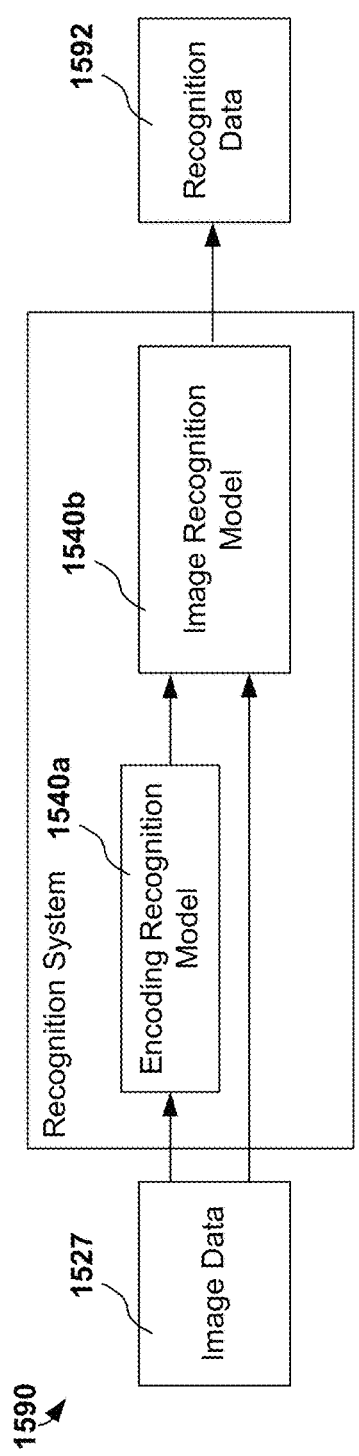
FIG. 13D depicts a block diagram of an example recognition system according to example embodiments of the present disclosure.

FIG. 13D depicts a block diagram of an example recognition system 1590 according to example embodiments of the present disclosure. In some implementations, the recognition system 1590 is trained to receive a set of image data 1527 descriptive of a scene containing one or more machine-readable visual encodings and, as a result of receipt of the image data 1527, provide recognition data 1592 that describes an association between one or more of the machine-readable visual encodings and one or more stored references (e.g., a confidence level of an association therebetween). In some implementations, the recognition system 1590 can include an encoding recognition model 1540a that is operable to process (e.g., decode) one or more machine-readable visual encodings described in the image data 1527. The recognition system 1590 can additionally contain an image recognition model 1540b for recognizing and/or otherwise processing contextual image data 1527 (e.g., for recognizing objects, persons, and/or structures described in the image data 1527; for performing depth mapping or other VPS techniques). The image data 1527 may flow directly to each of the models 1540a, 1540b, and/or proceed sequentially therethrough.

Figure 13E:
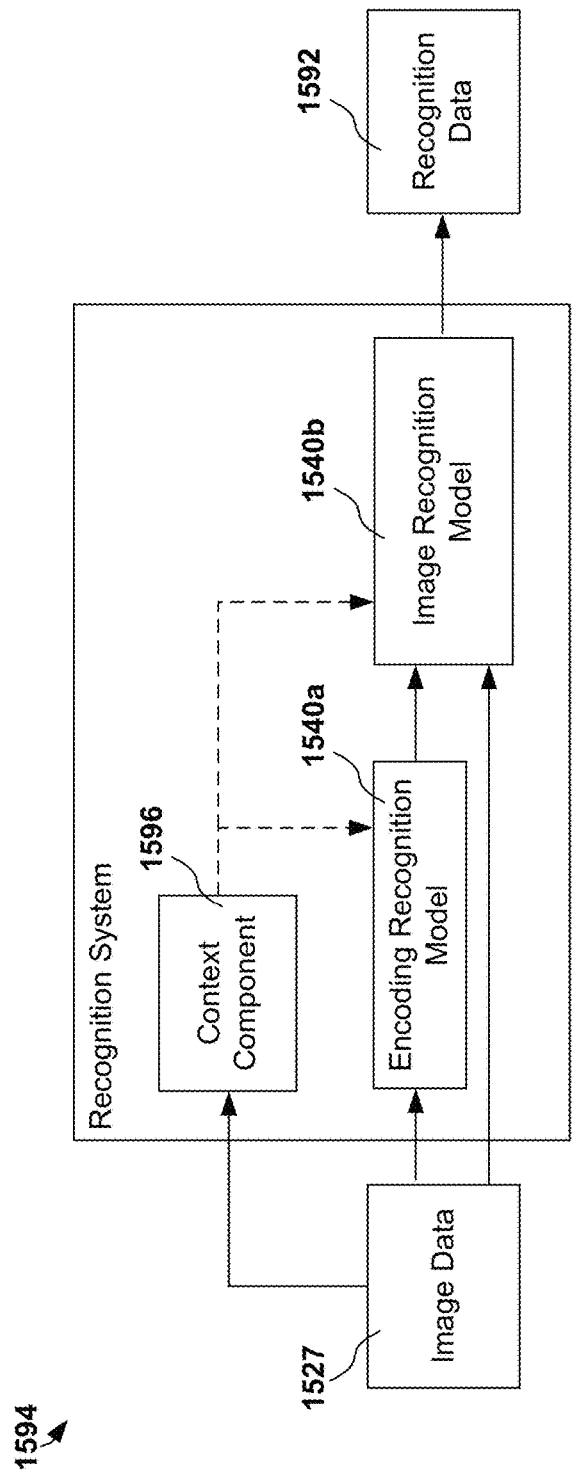
FIG. 13E depicts a block diagram of an example recognition system according to example embodiments of the present disclosure.

FIG. 13E depicts a block diagram of an example recognition system 1594 according to example embodiments of the present disclosure. The recognition system 1594 is similar to recognition system 1594 of FIG. 13D except that recognition system 1594 further includes a context component 1596, which can directly process context data stored in the image data 1527 (e.g., sensor data, such as metadata associated with one or more images of the image data).

In some embodiments, the recognition data 1592 can comprise a composite score describing the confidence(s) associated with each of the recognition model(s) 1540a, 1540b. In some embodiments, the recognition data 1592 can comprise a sum (weighted or unweighted). In some embodiments, the recognition data 1592 can be determined based on the higher of the confidence(s) associated with each of the recognition model(s) 1540a, 1540b.

EXAMPLE METHODS

Figure 14:
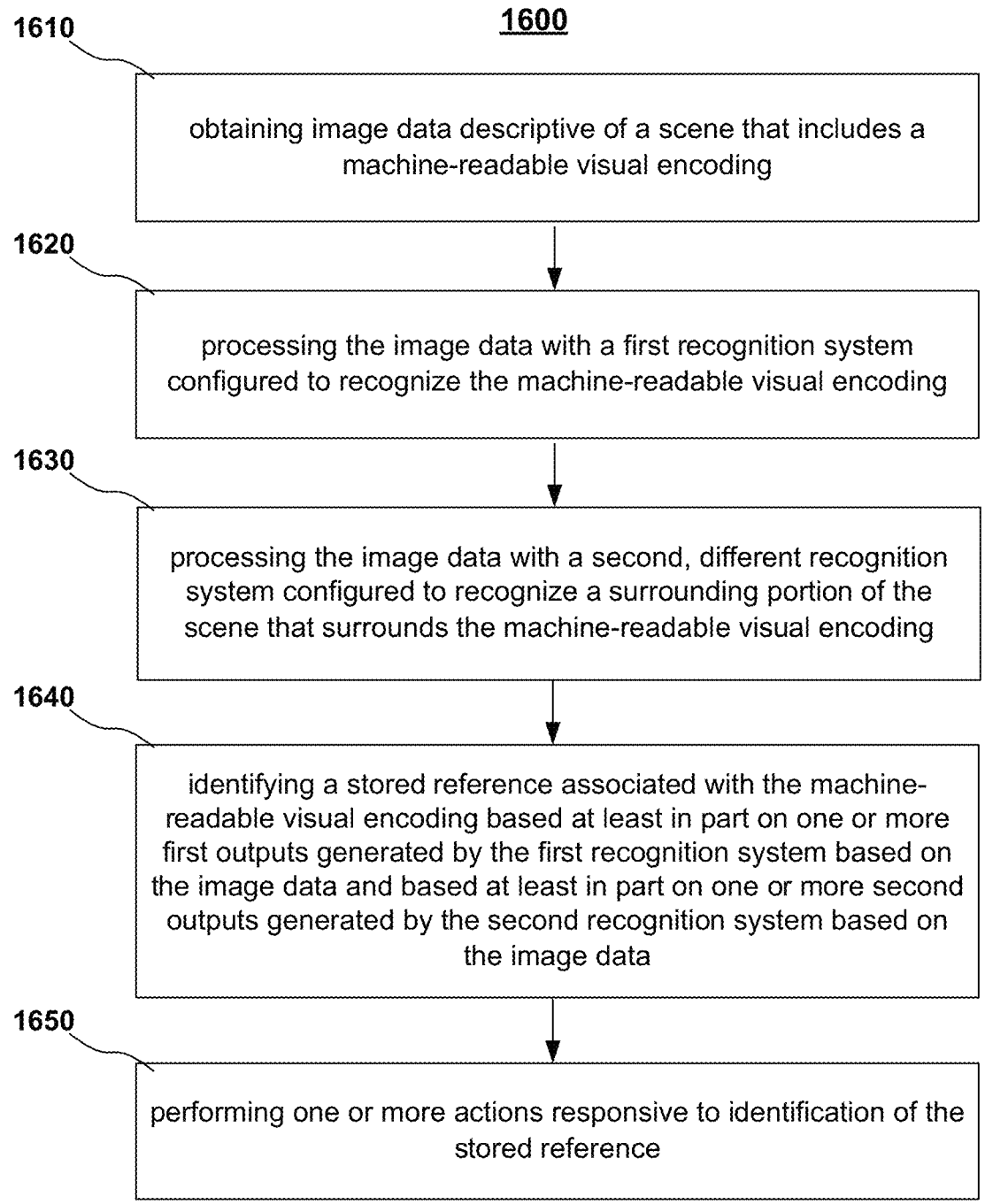
FIG. 14 depicts a flow chart diagram of an example method according to example embodiments of the present disclosure.

FIG. 14 depicts a flow chart diagram of an example method 1600 to perform according to example embodiments of the present disclosure. Although FIG. 14 depicts steps performed in a particular order for purposes of illustration and discussion, the methods of the present disclosure are not limited to the particularly illustrated order or arrangement. The various steps of the method 1600 can be omitted, rearranged, combined, and/or adapted in various ways without deviating from the scope of the present disclosure.

At 1610, a computing system obtains image data descriptive of a scene that includes a machine-readable visual encoding.

At 1620, the computing system processes the image data with a first recognition system configured to recognize the machine-readable visual encoding.

At 1630, the computing system processes the image data with a second, different recognition system configured to recognize a surrounding portion of the scene that surrounds the machine-readable visual encoding. In some embodiments, the image data comprises imagery associated with the machine-readable visual encoding and included in the surrounding portion of the scene containing an information display and/or an advertisement. In some embodiments, the second, different recognition system comprises a visual positioning system configured to extract visual features of the surrounding portion of the scene. In some embodiments, the second, different recognition system comprises a semantic recognition system configured to recognize semantic entities associated with the machine-readable visual encoding and referenced in the surrounding portion of the scene. In some embodiments, the second recognition system processes metadata associated with the image data (e.g., location data).

At 1640, the computing system identifies a stored reference associated with the machine-readable visual encoding based at least in part on one or more first outputs generated by the first recognition system based on the image data and based at least in part on one or more second outputs generated by the second recognition system based on the image data. In some embodiments, the identification is based on a composite output based on the one or more first outputs and the one or more second outputs. In some embodiments, at least one of the one or more first outputs may fail to meet a target value, and, responsive to determining that the at least one of the one or more first outputs fails to meet the target value, the computing system can generate the one or more second outputs by the second recognition system.

At 1650, the computing system performs one or more actions responsive to identification of the stored reference. In some embodiments, the computing system generates a verification indicator. In some embodiments, the verification indicator is configured to provide security credentials required for processing data encoded by the machine-readable visual encoding. In some embodiments, the data encoded in the machine-readable visual encoding is associated with a request to obtain access to a secure area, the scene contains two or more machine-readable visual encodings, and the security credentials are required to initiate the servicing of the request to obtain access to the secure area. In some embodiments, the request to obtain access to the secure area is associated with a package delivery entity for the delivery of a package to the secure area, the package comprising at least one of the two or more machine-readable visual encodings.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:
one or more processors; and
one or more non-transitory computer-readable media storing instructions that are executable by the one or more processors to cause the computing system to perform operations, the operations comprising:
decoding data using a first recognition system to process first image data descriptive of a machine-readable visual encoding that encodes the decoded data;
transmitting the decoded data to a server computing system to identify a stored reference, wherein the stored reference comprises one or more stored feature maps associated with a scene;
generating a feature map using a second recognition system to process second image data descriptive of a scene;
transmitting the feature map to the server computing system;
receiving, from the server computing system, a verification indicator that indicates a match between the generated feature map and the one or more stored feature maps; and
rendering, based on the verification indicator, an augmented reality rendering.

2. The computing system of claim 1, wherein the feature map describes features in three-dimensional space.

3. The computing system of claim 2, wherein the second recognition system comprises a visual positioning system.

4. The computing system of claim 3, the operations comprising:
locating anchor points on features in the scene.

5. The computing system of claim 1, comprising an imaging sensor, and wherein an image captured by the imaging sensor comprises the first image data and second image data.

6. The computing system of claim 1, the operations comprising:
determining a pose of the computing system with respect to the scene using a translation senor or a rotation sensor.

7. The computing system of claim 1, wherein the first image data represents an image of product packaging that includes the machine-readable visual encoding, and wherein the stored reference corresponds to a product associated with the product packaging.

8. One or more non-transitory computer-readable media storing instructions that are executable by one or more processors to cause a computing system to perform operations, the operations comprising:
decoding data using a first recognition system to process first image data descriptive of a machine-readable visual encoding that encodes the decoded data;
transmitting the decoded data to a server computing system to identify a stored reference, wherein the stored reference comprises one or more stored feature maps associated with a scene;
generating a feature map using a second recognition system to process second image data descriptive of a scene;
transmitting the feature map to the server computing system;
receiving, from the server computing system, a verification indicator that indicates a match between the generated feature map and the one or more stored feature maps; and
rendering, based on the verification indicator, an augmented reality rendering.

9. The one or more non-transitory computer-readable media of claim 8, wherein the feature map describes features in three-dimensional space.

10. The one or more non-transitory computer-readable media of claim 8, wherein the second recognition system comprises a visual positioning system.

11. The one or more non-transitory computer-readable media of claim 10, the operations comprising:
locating anchor points on features in the scene.

12. The one or more non-transitory computer-readable media of claim 8, the operations comprising capturing an image using an imaging sensor, the image comprising the first image data and second image data.

13. The one or more non-transitory computer-readable media of claim 8, the operations comprising:
determining a pose of the computing system with respect to the scene using a translation senor or a rotation sensor.

14. The one or more non-transitory computer-readable media of claim 8, wherein the first image data represents an image of product packaging that includes the machine-readable visual encoding, and wherein the stored reference corresponds to a product associated with the product packaging.

15. A computing system, comprising:
one or more processors; and
one or more non-transitory computer-readable media storing instructions that are executable by the one or more processors to cause the computing system to perform operations, the operations comprising:
receiving a first feature map generated by a first client computing device using a scene recognition system to process scene image data descriptive of a scene;
associating the first feature map with a stored reference;
receiving decoded data from a second computing device, wherein the decoded data was obtained by the second computing device using an encoding recognition system to process first image data descriptive of a machine-readable visual encoding that encodes the decoded data;
identifying the stored reference using the decoded data;
receiving a second feature map from the second computing device;
comparing the second feature map and the first feature map;
based on the comparison, initiating, for the second computing device, an augmented reality rendering.

16. The computing system of claim 15, the operations comprising:
transmitting, to the second computing device, a verification indicator.

17. The computing system of claim 15, wherein the scene recognition system comprises a visual positioning system.

18. The computing system of claim 15, wherein the comparison comprises:
determining a similarity between the first feature map and the second feature map.

19. The computing system of claim 15, wherein the first image data represents an image of product packaging that includes the machine-readable visual encoding, and wherein the stored reference corresponds to a product associated with the product packaging.

20. The computing system of claim 15, wherein the first feature map is generated from a plurality of vantage points of the scene, and wherein the second feature map is generated from a single vantage point of the scene.

* * * * *